(12) United States Patent (10) Patent No.: US 7,496,561 B2
Caudill et al. (45) Date of Patent: *Feb. 24, 2009

(54) METHOD AND SYSTEM OF RANKING AND CLUSTERING FOR DOCUMENT INDEXING AND RETRIEVAL

(75) Inventors: Maureen Caudill, San Diego, CA (US); Jason Chun-Ming Tseng, Millbrae, CA (US); Lei Wang, La Mesa, CA (US)

(73) Assignee: Science Applications International Corporation, San Diego, CA (US)

( * ) Notice: Subject to any disclaimer, the term of this patent is extended or adjusted under 35 U.S.C. 154(b) by 755 days.

This patent is subject to a terminal disclaimer.

(21) Appl. No.: 10/724,170

(22) Filed: Dec. 1, 2003

(65) Prior Publication Data

US 2004/0111408 A1 Jun. 10, 2004

Related U.S. Application Data

(62) Division of application No. 09/761,188, filed on Jan. 18, 2001, now Pat. No. 6,766,316.

(51) Int. Cl.
*G06F 7/00* (2006.01)
(52) U.S. Cl. .......................................... 707/3; 707/100
(58) Field of Classification Search .................... 707/3, 707/100; 704/1
See application file for complete search history.

(56) References Cited

U.S. PATENT DOCUMENTS 4,270,182 A 5/1981 Asija
4,864,502 A 9/1989 Kucera et al.
4,887,212 A 12/1989 Zamora et al.

(Continued)

FOREIGN PATENT DOCUMENTS

EP 0413132 A 2/1991
WO WO 0049517 A 8/2000

OTHER PUBLICATIONS

Maarek et al. ("Ephemeral Document Clustering for Web Applications", IBM Research Report, RJ 10186, Apr. 2000).*

(Continued)

*Primary Examiner*—John E Breene
*Assistant Examiner*—Dennis Myint
(74) *Attorney, Agent, or Firm*—Banner & Witcoff, Ltd.

(57) ABSTRACT

A relevancy ranking and clustering method and system that determines the relevance of a document relative to a user's query using a similarity comparison process. Input queries are parsed into one or more query predicate structures using an ontological parser. The ontological parser parses a set of known documents to generate one or more document predicate structures. A comparison of each query predicate structure with each document predicate structure is performed to determine a matching degree, represented by a real number. A multilevel modifier strategy is implemented to assign different relevance values to the different parts of each predicate structure match to calculate the predicate structure's matching degree. The relevance of a document to a user's query is determined by calculating a similarity coefficient, based on the structures of each pair of query predicates and document predicates. Documents are autonomously clustered using a self-organizing neural network that provides a coordinate system that makes judgments in a non-subjective fashion.

19 Claims, 16 Drawing Sheets

U.S. PATENT DOCUMENTS

| | | | |
|---|---|---|---|
| 4,914,590 | A | 4/1990 | Loatman et al. |
| 4,984,178 | A | 1/1991 | Hemphill et al. |
| 5,056,021 | A | 10/1991 | Ausborn |
| 5,101,349 | A | 3/1992 | Tokuume et al. |
| 5,146,406 | A | 9/1992 | Jensen |
| 5,237,502 | A | 8/1993 | White et al. |
| 5,297,039 | A | 3/1994 | Kanaegami et al. |
| 5,309,359 | A | 5/1994 | Katz et al. |
| 5,317,507 | A | 5/1994 | Gallant |
| 5,321,833 | A | 6/1994 | Chang et al. |
| 5,331,556 | A | 7/1994 | Black, Jr. et al. |
| 5,386,556 | A | 1/1995 | Hedin et al. |
| 5,404,295 | A | 4/1995 | Katz et al. |
| 5,418,948 | A | 5/1995 | Turtle |
| 5,446,891 | A | 8/1995 | Kaplan et al. |
| 5,475,588 | A | 12/1995 | Schabes et al. |
| 5,535,382 | A | 7/1996 | Ogawa |
| 5,576,954 | A | 11/1996 | Driscoll |
| 5,619,709 | A | 4/1997 | Caid et al. |
| 5,675,710 | A | 10/1997 | Lewis |
| 5,680,627 | A | 10/1997 | Anglea et al. |
| 5,687,384 | A | 11/1997 | Nagase |
| 5,694,523 | A | 12/1997 | Wical |
| 5,694,592 | A | 12/1997 | Driscoll |
| 5,706,497 | A | 1/1998 | Takahashi et al. |
| 5,721,902 | A | 2/1998 | Schultz |
| 5,721,938 | A | 2/1998 | Stuckey |
| 5,761,389 | A | 6/1998 | Maeda et al. |
| 5,790,754 | A | 8/1998 | Mozer et al. |
| 5,794,050 | A | 8/1998 | Dahlgren et al. |
| 5,802,515 | A | 9/1998 | Adar et al. |
| 5,835,087 | A | 11/1998 | Herz et al. |
| 5,864,855 | A | 1/1999 | Ruocco et al. |
| 5,870,701 | A * | 2/1999 | Wachtel .................. 704/9 |
| 5,870,740 | A | 2/1999 | Rose et al. |
| 5,873,056 | A * | 2/1999 | Liddy et al. ............. 704/9 |
| 5,893,092 | A | 4/1999 | Driscoll |
| 5,915,249 | A | 6/1999 | Spencer |
| 5,920,854 | A | 7/1999 | Kirsch et al. |
| 5,930,746 | A | 7/1999 | Ting |
| 5,933,822 | A | 8/1999 | Braden-Harder et al. |
| 5,940,821 | A | 8/1999 | Wical |
| 5,953,718 | A | 9/1999 | Wical |
| 5,960,384 | A | 9/1999 | Brash |
| 5,963,940 | A | 10/1999 | Liddy et al. |
| 5,974,412 | A | 10/1999 | Hazlehurst et al. |
| 5,974,455 | A | 10/1999 | Monier |
| 6,006,221 | A | 12/1999 | Liddy et al. |
| 6,012,053 | A | 1/2000 | Pant et al. |
| 6,021,387 | A | 2/2000 | Mozer et al. |
| 6,021,409 | A | 2/2000 | Burrows |
| 6,026,388 | A | 2/2000 | Liddy et al. |
| 6,038,560 | A | 3/2000 | Wical |
| 6,047,277 | A | 4/2000 | Parry et al. |
| 6,049,799 | A | 4/2000 | Mangat et al. |
| 6,055,531 | A | 4/2000 | Bennett et al. |
| 6,076,051 | A | 6/2000 | Messerly et al. |
| 6,233,575 | B1 | 5/2001 | Agrawal et al. |
| 6,760,720 | B1 * | 7/2004 | De Bellis .................. 707/3 |
| 2002/0143521 | A1 * | 10/2002 | Call ......................... 704/1 |
| 2002/0143755 | A1 | 10/2002 | Wynblatt et al. |
| 2003/0101182 | A1 * | 5/2003 | Govrin et al. ............. 707/7 |
| 2003/0172058 | A1 * | 9/2003 | Namba ..................... 707/3 |
| 2003/0177112 | A1 * | 9/2003 | Gardner .................... 707/3 |
| 2003/0225755 | A1 * | 12/2003 | Iwayama et al. .......... 707/3 |
| 2004/0010501 | A1 * | 1/2004 | Anderson et al. ........ 707/100 |

OTHER PUBLICATIONS

Dorocak ("Conditional Syntactic Specification", Proceedings of the Annual Conference, Aug. 1973, http://portal.acm.org/citation.cfm?id=805689&coll=ACM&dl=ACM&CFID=70592246&CFTOKEN=81322794).*

Lee, J.A.N. et al., "Conditional Syntactic Specification", Proceedings of the Annual Conference, pp. 101-105, [online], 1973 <URL:http://delivery.acm.org/10.1145/810000/805689/p101-lee.pdf?key1=805689&key2=0973360221&coll=GUIDE&dl=GUIDE&CFID=1775224&CFTOKEN=37341456>.*

Resnik, Phillip, "A Class-Based Approach To Lexical Discovery", Proceedings of 30th Annual Meeing on Association for Computational Linguistics [online], 1992 <URL:http://delivery.acm.org/10.1145/990000/982021/p327-resnik.pdf?key1=982021&key2=4214360221&coll=GUIDE&dl=GUIDE&CFID=1775224&CFTOKEN=37341>.*

Koller, D., and Sahami, M. Hierarchically classifying documents using very few words. ICML-97: Proceedings of the Fourteenth International Conference on Machine Learning, 1997.

Susan T. Dumais, John Platt, David Hecherman, Mehran Sahami: Inductive Learning Algorithms and Representations for Text Categorization. CIKM pp. 148-155, 1998.

Andrew McCallum, Kamal Nigam, Jason Rennie and Kristie Seymore. Building Domain-Specific Search Engines with Machine Learning Techniques. AAAI-99 Spring Symposium, 1999.

M. Sahami, S. Dumais, D. Heckerman, and E. Horvitz. A Bayesian approach to filtering junk e-mail. AAAI Workshop on Learning for Text Categorization, Jul. 1998, Madison, Wisconsin.

Larkey, Leah S. (1999) A Patent Search and Classification System In Digital Libaries 99—The Fourth ACM Conference on Digital Libraries (Berkeley, CA, Aug. 11-14 1999) ACM Press, pp. 79-87.

Teuvo Kohonen, *Self Organization and Associative memory*, 3rd Edition, Table of Contents, Springer-Verlag, New York, NY 1989.

Dunja Mladinic, Turning Yahoo into an Automatic Web-Page Classifier, ECAI 98: 13th European Conference on Artificial Intelligence, Brighton, UK, Aug. 23-28, 1998, 473-474, John Wiley & Sons, Ltd.

Tom M. Mitchell, "Machine Learning", WCB/McGraw-Hill 1997.

Choon Yang Quek, "Classification of World Wide Web Documents", Senior Honors Thesis, CMU, Dec. 2003.

Bresnan, Joan (ed.). 1982. The Mental Representation of Grammatical Relations. Cambridge, MA: MIT Press.

Charniak, Eugene. 1993. Statistical Language Learning. Cambridge, MA: MIT Press.

Domingos, Pedro and Michael Pazzani. 1997. "On the Optimality of the Simple Bayesian Classifier Under Zero-One Loss."Machine Learning 29:103-130.

Duda, Richard and Peter Hart. 1973. Pattern Classification and Scene Analysis. New York, NY: Wiley.

Gold, Mark. 1967. "Language Identification in the Limit." Information and Control 10:447-474.

Horning, James. 1969. A Study of Grammatical Inference. PhD. thesis, Stanford.

Magerman, David and Mitchell Marcus. 1991. "Pearl: A Probabilistic Chart Parser." Proceedings of the 2nd International Workshop for Parsing Technologies.

Magerman, David and Carl Weir. 1992. "Efficiency, Robustness, and Accuracy in Picky Chart Parsing." Proceedings of the 30th Annual Meeting of the Association for Computational Linguistics, pp. 40-47.

Manning, Christopher and Hinrich Schutze. 1999. Foundations of Statistical Natural Language Processing. Cambridge, MA: MIT Press.

McCallum, A., K. Nigam, S. Thrun, and T. Mitchell. 1998. "Learning to Classify Text from Labeled and Unlabeled Documents." Proceedings of the 1998 National Conference on Artificial Intelligence, Jul. 1998.

McCallum, A., R. Rosenfeld., T. Mitchell and A. Ng. 1998. "Improving Text Classification by Shrinkage in a Hierarchy of Classes," Proceedings of the 1998 International Conference on Machine Learning.

Pollard, Carl and Ivan Sag. 1994. Head-Driven Phrase Structure Grammar. Chicago, IL: University of Chicago Press.

Dirk van Eylen, "Ranking of search results using AltaVista", http://ping4.ping.be/~ping0658/avrank.html, Jan. 1998.

Avrim Blum, Tom Mitchell, "Combining Labeled and Unlabeled Data with Co-Training", Proceedings of the 1998 conference on Computational Learning Theory.

* cited by examiner

Table 1 Examples of Modifier Names and Weights

| Modifier Name | Explanation of Modifier | Weight |
|---|---|---|
| VerbOnlyMatchModifier | Parameter for two matching predicates in two predicate structures. | 4 |
| NounModifier | Parameter for matching noun arguments in two predicate structures | 6 |
| VerbNounMatchModifier | Parameter for matching complete predicate structures. | 8 |
| PredicateStructureExactMatchModifier | Parameter for two exactly matched predicate structures | 40 |
| PredicateExactMatchModifier | Parameter for two exactly matched predicates | 25 |
| ConceptExactMatchModifier | Parameter for two exactly matched concepts | 15 |
| ConceptProximityModifier | Parameter considering the ontological relationship between two concepts | $ConceptExactMatchModifier \times (1 - \frac{highest\_order\_difference\_digit}{identifier\_digit\_number})$ |
| SameStemModifier | Parameter for two words from same stem | 20 |
| ArgumentMatchModifier | Parameter for two arguments that exactly match | 10 |
| ProperNounExactMatchModifier | Parameter for two exactly matched proper nouns | 15 |
| SymbolMatchModifier | Parameter for two matched symbols | 10 |
| FrontLineModifier | Parameter for a predicate in which the corresponding sentence occurs in the first 10 sentences of the document | 5 |
| DocSizeModifier | Parameter to adjust for overall document size | 0.035 |

*Figure 3*

METHOD AND SYSTEM OF RANKING AND CLUSTERING FOR DOCUMENT INDEXING AND RETRIEVAL

FIELD OF THE INVENTION

The relevancy ranking and clustering method and system for document indexing and retrieval of the present invention is intended to provide mechanisms for an information retrieval system to rank documents based on relevance to a query and in accordance with user feedback. A user can make queries in the form of natural language, keywords or predicates. Queries are converted into ontology-based predicate structures and compared against documents, which have been previously parsed for their predicates, to obtain the best possible matching documents, which are then presented to the user. The present method and system is designed to automate judgments about which documents are the best possible matches to a query within a given index. The system is further designed to allow users to provide feedback in order to fine-tune the automated judgment procedure.

BACKGROUND OF THE INVENTION

As the volume of information available on the Internet increases, the need for methods to search, filter, and manage such information is increasing. Text categorization has become an important component in many information search and retrieval systems. Conventional search and retrieval systems commonly classified information into several pre-defined categories. For example, Yahoo!'s topic hierarchy provides a complex tree of directories to help users locate information on the Internet. In many search engine companies, trained text editors manually categorize information. Such manual classification of information is not only a very time-consuming and costly process, but is also plagued by inconsistencies and oversight problems. To overcome such problems, automated methods for categorizing text are becoming more common.

U.S. Pat. No. 5,418,948 to Turtle discloses an information retrieval system, which stems all input words (as well as removing stopwords), and matches the resulting queries against a table of known phrases in order to convert phrasal inputs into a standardized format. A Bayesian inference network ranks the results, where each document is associated with a set of probabilities for all of the words within the document. These probabilities are calculated with respect to a hierarchy of document-organization categories. Retrieval may be accomplished through two techniques, which can result in different rankings for the same collection of documents.

The first technique used by Turtle is document-based scanning, where each document is evaluated according to the probabilities of each of its attributes in order to determine the probability that it answers the query. After a sufficient number of documents are retrieved, while scanning continues through the collection, documents are only evaluated through a subset of their attributes. This means that after some critical number of documents is reached, documents which are unlikely to rank higher than the lowest-ranking document in the set are not added to the list of results.

The second technique involves so-called concept-based scanning, where all documents containing a query concept (including its synonyms as defined in a thesaurus) are evaluated according to the probability of the query attribute within the document. This means that only a few attributes are examined for each document, but they are the same for all documents. As with document-based scanning, documents are no longer added to the result set when a critical number is reached and the probability of a new document outranking any documents currently within the set is extremely low. The stopping criteria are not identical, and the interpretation of the same attribute probabilities may lead to different rankings for the same documents, even when matched by the same query. In both cases, scoring is calculated by averaging the probabilities for all of the attributes in the query (adding the individual probabilities, then dividing by the number of concepts).

Turtle's system is deficient in several respects. First, by scoring documents according to the relative occurrences of terms within the index, highly relevant documents with low-probability concepts may be missed. Second, periodic recalculation of attribute probabilities is a necessary performance penalty, if new documents will change the probability distribution of the attribute set. Third, the thesaurus-based approach treats synonyms as equally valuable terms in a query. This may expand the result set such that the stopping criteria described above end up filtering out documents containing the exact match in favor of documents containing a higher proportion of synonymous words. It is not clear that this is a desirable result from the standpoint of an end-user who is particularly interested in the exact word used for the query. Turtle's system does not take grammatical structure into account; in fact, it does not take adjacency information into account, since each document is treated as a "bag of words," with no preservation of order information.

U.S. Pat. No. 4,270,182 to Asija discloses a system for asking free-form, un-preprogrammed, narrative questions. The system of Asija accepts unstructured text from multiple sources and divides the text into logical information units. These logical information units may be sentences, paragraphs, or entire documents; each logical information unit is assigned a unique identification number, and is returned as a whole when it is selected for retrieval. The retrieval system of Asija uses standard keyword-based lookup techniques.

The procedure of Asija only applies to the logical information units, which are ranked as equally relevant at the end of a preceding stage. Both synonyms and searchonyms are considered as equivalent to query words found within the logical information units. The net effect of the ranking and filtering process of Asija is to order documents by maximizing the number of query words matched, followed by the number of instances of query words. Furthermore the Asija system does not take grammatical structure into account. In addition, synonyms are not exact matches for queries, and thus should be ranked lower. The Asija system also only makes use of literal text strings, as all synonyms must be specified by dictionary files that list text strings as equivalent.

A key feature of the present invention is the unique and novel method of representing text in the form of numerical vectors. The vectorization techniques of the present invention offer several advantages over other attempts to represent text in terms of numerical vectors. First, the numbers used are ontologically generated concept representations, with meaningful numerical relationships such that closely related concepts have numerically similar representations while more independent concepts have numerically dissimilar representations. Second, the concepts are represented in the numerical form as part of complete predicate structures, ontological units that form meaningful conceptual units, rather than simple independent words. Third, the vectorization method and system described herein provides a way to represent both large portions of long documents and brief queries with vector representations that have the same dimensionality. This permits rapid, efficient relevancy ranking and clustering by comparing the query vectors with substantial portions of documents, on the order of a page or more at a time, with no loss of accuracy or precision. Furthermore, it permits comparisons of large-scale patterns of concepts across entire documents rather than the small moving windows used in prior systems. These advantages provide the present method and system with unique performance and accuracy improvements over conventional systems.

SUMMARY OF THE INVENTION

The basic premise of relevancy ranking and clustering is that a set of documents is sorted or ranked, according to certain criteria and clustered to group similar documents together in a logical, autonomous manner.

The relevancy ranking and clustering method and system of the present invention scores documents by word meaning and logical form in order to determine their relevance to the user's query. It also compares patterns of concepts found within documents to the concepts within the query to determine the most relevant documents to that query.

As part of the relevancy ranking and clustering method and system, documents and user queries are first parsed into ontological predicate structure forms, and those predicate structures are used to produce a novel numerical vector representation of the original text sources. The resulting vector representations of documents and queries are used by the relevancy ranking unit and the document clustering component of the present invention to perform the ranking and clustering operations described herein. The unique and novel method of producing the vector representations of documents and queries provides efficiency, accuracy, and precision to the overall operation of the relevancy ranking and clustering method and system.

Input queries and documents are parsed into one or more predicate structures using an ontological parser. An ontological parser parses a set of known documents to generate one or more document predicate structures. Those predicate structures are then used to generate vector representations of the documents and queries for later use by the ranking and clustering method and system.

The ranking and clustering method and system performs a comparison of each query predicate structure with each document predicate structure, and of document vectors to query vectors, to determine a matching degree, represented by a real number. A multilevel modifier strategy is implemented to assign different relevance values to the different parts of each predicate structure match to calculate the predicate structure's matching degree.

When many documents have a high similarity coefficient, the clustering process of the relevancy ranking and clustering method provides a separate, autonomous process of identifying documents most likely to satisfy the user's original query by considering conceptual patterns throughout each document, as opposed to individual concepts on a one-by-one basis.

The relevancy ranking and clustering method and system of the present invention provides a fine-grained level of detail for semantic comparisons, due to the fact that conceptual distance can be measured and weighted absolutely for all terms within a query. In addition, the relevancy ranking and clustering method and system of the present invention provides a sophisticated system for ranking by syntactic similarity, because syntactic evaluation occurs on lists of predicate arguments. The manner in which the arguments are derived is irrelevant, and can be accomplished through any syntactic parsing technique. This provides a more general-purpose ranking system.

The relevancy ranking and clustering method and system of the present invention ranks according to grammatical structure, not mere word adjacency. Thus, a passive sentence with more words than an equivalent active sentence would not cause relevant documents to be weighted lower. The relevancy ranking and clustering method and system of the present invention makes use of actual word meaning, and allows the user to control ranking based on word similarity, not just presence or absence.

The relevancy ranking and clustering method and system of the present invention also ranks according to conceptual co-occurrence rather than simple word or synonym co-occurrence as is found in other systems. This provides the advantage of recognizing that related concepts are frequently found near each other within bodies of text. The relevancy ranking and clustering method and system furthermore considers overall patterns of concepts throughout large documents and determines matches to query concepts no matter where in the document the matches occur.

The relevancy ranking and clustering method and system additionally provides simple and efficient means of recognizing that frequency of occurrence of concepts within a document often correspond to relative importance of those concepts within the document. The present invention autonomously recognizes frequently occurring query concepts located within a document and judges such documents as more relevant than documents in which the query concepts occur only rarely. The autonomous and efficient method of accomplishing this is based both on the unique vectorization techniques described herein and on the operation of the ranking and clustering method and system.

The relevancy ranking and clustering method and system of the present invention allows the user to specify whether documents similar to a particular document should be ranked higher or lower, and automatically re-ranks such documents based on a neural network. The neural network provides a coordinate system for making such judgments in an autonomous and non-subjective fashion, which does not require trial-and-error efforts from the user. Finally, there is no code generation or recompilation involved in the present system, which only performs the needed document clustering once; requests for similar or different information return a different segment of the result set, but without recomputing the relations between all the documents, as is required in a spreadsheet-like or other statistical approach.

The relevancy ranking and clustering method and system of the present invention uses grammatical relationship information to adjust ranking relations. Although words do not need to be grammatically related to each other within a document to include the document in the result set, such relationships serve to adjust the rankings of otherwise similar documents into a non-random, logical hierarchy. Furthermore, each word within the present system is a meaningful entity with mathematically meaningful distances relative to other concepts. Thus, synonyms are not treated as probabilistically equal entities, but are assigned lower rankings depending on how far they are from the exact query word given by the user.

Documents containing sentences that logically relate query terms are ranked higher than documents which simply contain instances of those terms. Similarly, thesaurus-like query expansion is made possible through the use of ontologies, and the present ranking system enables similar concepts to be graded according to the degree of their similarity. This capability represents a significant innovation over other purely statistical techniques.

In addition to giving higher weights to documents where search terms occur in close proximity, the relevancy ranking method and system of the present invention is able to make further discrimination by whether or not the search terms are bound together in a single predicate within a document. Additionally, the relevancy ranking and clustering method and system of the present invention is capable of discriminating between documents based on conceptual similarity so that conceptually similar, but inexact, matches receive lower weights than exactly matched documents.

In the relevancy ranking and clustering method and system of the present invention, the vector representations of individual documents and user queries are based not on individual words but on patterns of conceptual predicate structures. Dynamic alteration can be made to the content of the document sets, thus allowing the relevancy ranking and clustering method and system to begin its processing even before the search for potential matching documents is complete.

As a result, the relevancy ranking and clustering method and system of the present invention provides an automatic process to cluster documents according to conceptual meanings. The present system is designed to make fine discriminations in result ranking based on the degree of conceptual similarity between words, i.e., exactly matched words result in higher rankings than synonyms, which in turn result in higher rankings than parent concepts, which in turn result in higher rankings than unrelated concepts.

BRIEF DESCRIPTION OF THE DRAWINGS

These and other attributes of the present invention will be described with respect to the following drawings in which:

FIG. 3 is Table 1 showing examples of modifier names and weights according to the present invention;

DETAILED DESCRIPTION OF THE INVENTION

The relevancy ranking and clustering method and system of the present invention is intended, as one example application, to work with the concept-based indexing and search system set forth in co-pending patent application Ser. No. 09/627,295, which indexes collections of documents with ontology-based predicate structures through automated and/or human-assisted methods, and which is incorporated herein by reference. The relevancy ranking and clustering method and system can also be used with other document indexing and information retrieval systems, including question-answering systems, as described below.

In one example application of the present invention as embodied as part of a concept-based indexing and search system, a user can make queries in the form of natural language, keywords, or predicates. Queries are converted into ontology-based predicate structures, if necessary, and compared against documents, which have been previously parsed for their ontology-based predicates, to obtain the best possible matching documents, which are then presented to the user.

The transformation of natural language sentences into predicate structures is performed by an ontological parser, as set forth in co-pending patent application Ser. No. 09/697,676, and incorporated herein by reference.

Predicate structures are representations of logical relationships between the words in a sentence. Every predicate structure contains a predicate, which consists of either a verb or a preposition, and a set of arguments, each of which may be any part of speech. The ontological parser converts a series of sentences first into a collection of parse trees, and then into a collection of completed predicate structures.

Ontologies are hierarchies of related concepts, usually represented by tree structures. The ontology-based parser for natural language processing application set forth in co-pending patent application Ser. No. 09/697,676, introduces a new implementation of this tree structure. The proposed data structure consists of an integer value, where each digit of the integer corresponds to a specific branch taken at the corresponding level in the tree.

Figure 1:
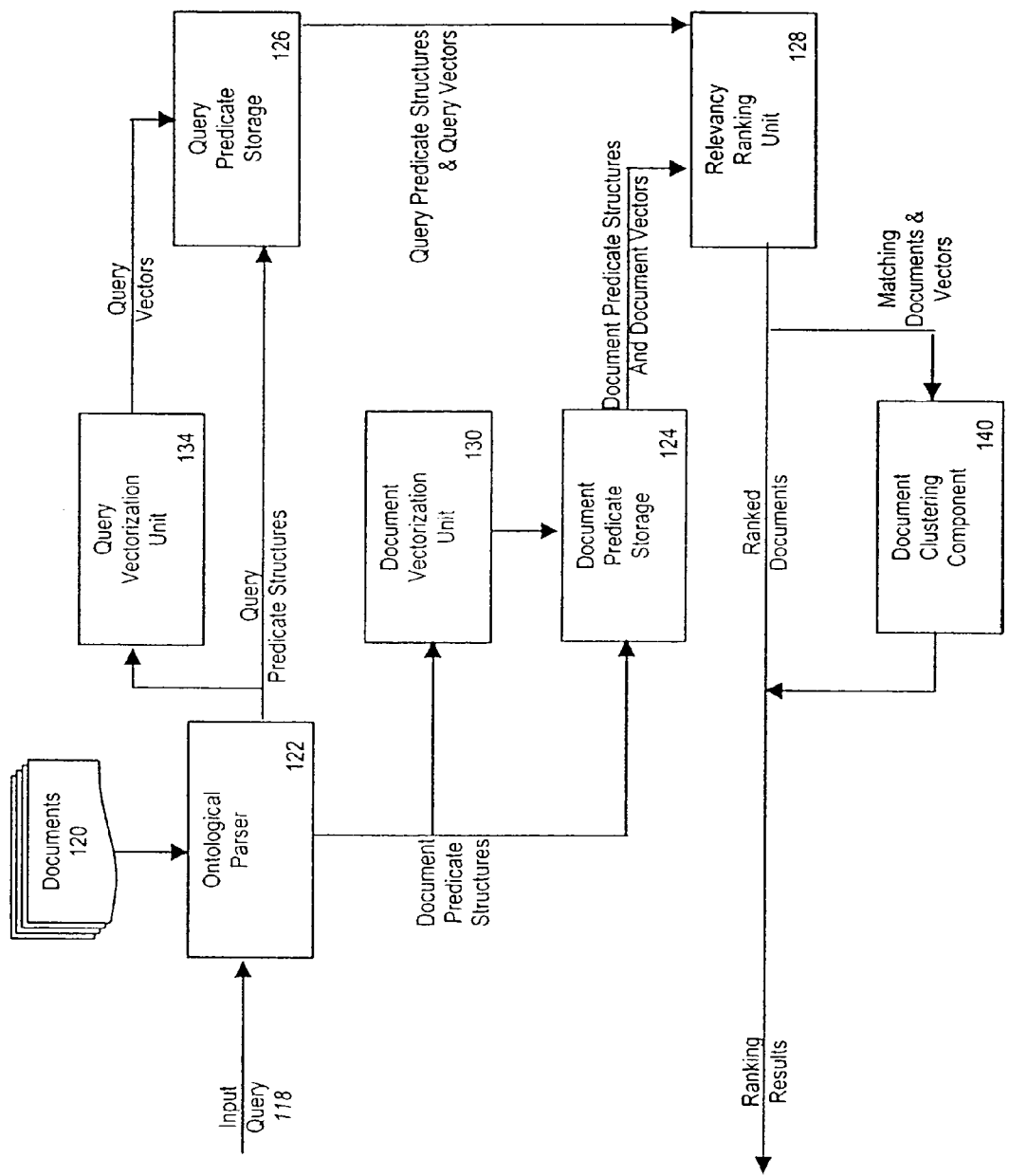
FIG. 1 is a block diagram illustrating a relevancy ranking component according to the present invention.

FIG. 1 illustrates a high-level block diagram of the method of ranking the similarity between an input query 118 and a set of documents 120 according to the present invention as embodied in the example system described above.

The relevancy ranking and clustering method and system consists of three major units that work together to provide the required ranking and clustering services. The block diagram in FIG. 1 illustrates how the units combine to rank and cluster documents in response to a user query in an example application of the present system.

The first unit of the present system, the vectorization unit transforms the representations of documents and queries into a vector form. In order for the parsed documents and queries to be used in the document clustering component and in portions of the relevancy ranking unit, the documents and queries must be represented as multidimensional numerical vectors. These vector representations provide the means of efficient comparison between the documents and the query. An individual document may be represented by a single document vector, or it may be represented by a collection of document vectors, depending on the parameters of the vector representation process and the length of the document. Queries are typically very brief, usually containing only one, or possibly a few predicate structures. Documents, on the other hand, typically contain tens or even hundreds of predicate structures. Despite this disparity in the amount of information to be converted to vector representation, it is essential that both query vectors and document vectors have exactly the same number of vector elements in order for comparisons between the two to be valid.

The vectorization unit of the present system provides an innovative and unique process for: (a) converting the text of documents and queries into multidimensional numerical vectors; (b) ensuring that those vector representations are appropriately normalized for use in document-to-query comparisons; and (c) guaranteeing that no matter how long the document and how short the query, all such vector representations have exactly the same dimensionality. This vectorization process thus provides the basis for the further comparison of documents and queries through processes as typified by the document clustering component and the relevancy ranking unit. However, the vectorization method described here can also support other methods of comparisons that have similar vector representation requirements.

The vectorization unit has two configurations, a document vectorization unit 130 and a query vectorization unit 134. Each of these configurations converts ontologically parsed text into vector representations. The document vectorization unit 130 converts the set of predicate structures derived from ontologically parsing a document into one or more large-dimensioned numerical vectors. The query vectorization unit 134 performs the same task for an ontologically parsed user query. The resulting vectors are saved along with the predicate structures they were derived from in the corresponding document predicate storage unit 124 and query predicate storage unit 126. These vectors are used by the remaining two pieces of the present system, the relevancy ranking unit 128 and the document clustering component 140.

The second piece of the present system, the relevancy ranking unit 128, provides concept-by-concept comparison of individual predicate structures to a user's query. It also provides a coarse-grained relevancy estimate by comparing an overall pattern of predicate structures in the document to the user's query.

The third piece, the document clustering component 140, does fine-grained discrimination when many documents appear to be close matches to the user's query. This portion of the present method and system identifies groupings of such matching documents and provides a feedback method to rapidly identify which grouping or groupings are most applicable to the user query. Each of these three major units of the relevancy ranking and clustering method and system will be discussed in detail below.

Figure 2:
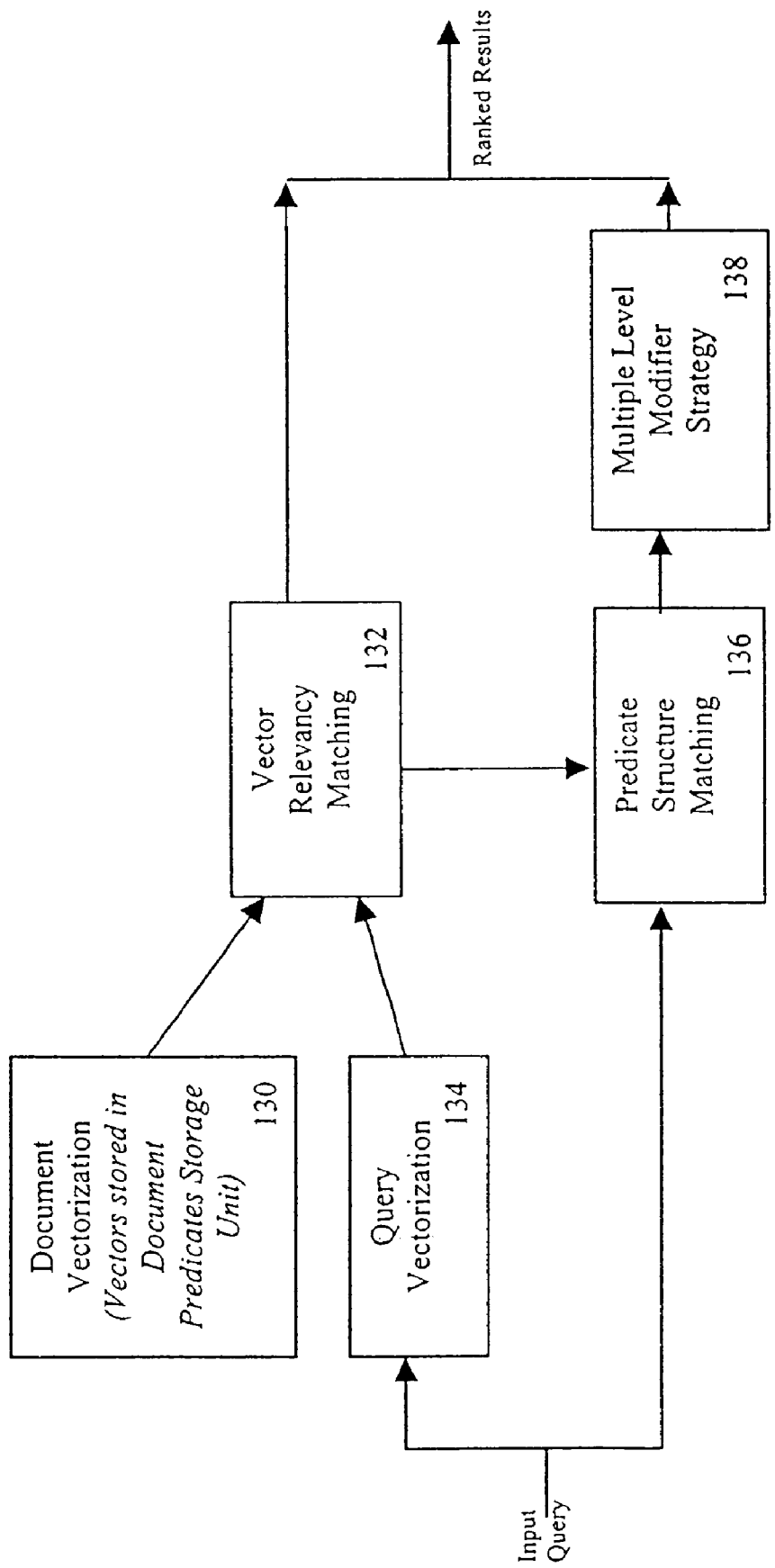
FIG. 2 is a block diagram illustrating a relevancy ranking method performed by the relevancy ranking component shown in FIG. 1, according to the present invention.

The document vectors are generated by the document vectorization unit, 130, illustrated in FIG. 2. This process receives the complete set of predicate structures produced as a result of the ontological parse of the document, and combines them to produce one or more numerical vectors that represent the pattern of predicate structures within the document. A similar query vectorization process is performed by a query vectorization unit, 134, also shown in FIG. 2. These document vectors and query vectors are used both by the vector matching component of the relevancy ranking unit and by the document clustering component. The details of the vectorization process, which are similar for both documents and queries, are explained below.

The first step in vectorization of documents occurs when the ontological parser 122 originally processes the documents and their corresponding predicate structures stored in the document predicate libraries, as illustrated by document vectorization unit block 130 in FIG. 1 and FIG. 2. One or more vector representations based on those predicate structures are generated by the document vectorization unit and stored for future access. The same document vectors are used both by the document clustering component and by the vector relevancy matching component of the relevancy ranking unit.

The predicate structures in the document predicate library are each identified by a predicate key. The predicate key is a fixed-length integer representation of the predicate, in which conceptual nearness corresponds to numerical nearness. Thus, a simple subtraction operation yields a rough estimate of the relative conceptual nearness of the predicates. For example, the integer representations for "give" and "donate" are conceptually nearer than the representations for "give" and "purchase," and thus, the difference between the integer representations of "give" and "donate" is smaller than the difference between the integer representations of "give" and "purchase."

One or more multi-dimensional vectors are constructed for each document 120 using the integer representations of the predicate structures identified within the document 120 to perform vector relevancy matching for each document 120, in block 132 of FIG. 2. Because of the need for uniformity in vector relevancy matching results, a fixed number of predicate structures, M, are used. Typically, these represent the first M predicate structures in the document 120. Either only the predicate or, optionally, the predicate plus a fixed number of arguments from the predicate structure may be included from each predicate structure.

In the case where a fixed number of arguments are used, any predicate structure with fewer than that number of arguments uses zeros in the remaining unfilled argument positions. Any predicate structure with more than the specified number of arguments fills the argument positions until argument positions are all filled; remaining arguments are ignored and omitted from the vector representation. Thus, if exactly two arguments are to be included from each predicate structure, a predicate structure with only one argument would insert a 0 for the second position. A predicate structure with three arguments would include the first two and omit the third.

The result of this process is an N-dimensional vector representation of that document 120, where N=M if only the predicate portion of the predicate structures are used, and N=q*M if a fixed number of arguments (q−1) from the predicate structures are included. This is a design choice or system parameter. In most practical applications, N will typically be a moderately large number, on the order of 50 to 100, although there is no conceptual limit on its size. However, there may be some performance degradation, as N grows larger.

In another embodiment, to perform vector relevancy matching of longer documents, a document 120 may be represented by multiple vectors instead of only one. Thus, the first N predicates, optionally including a fixed number of arguments for each predicate, are used for the first vector representation, the next N predicates and arguments are used for the next vector representation, and so on, until there are fewer than N unused predicates and arguments remaining. For the final vector, the last N predicates and arguments are used, even if there is some overlap between this vector and the immediately previous vector.

Once the vectors that represent a document 120 are composed, each must be normalized to a fixed vector length. Normalization can be performed using any of a variety of well-known and established techniques. It is not necessary that normalization be performed to a unit-length vector; any constant length is acceptable. A typical simple normalization technique to a unit-length vector is to divide each vector element by the length of the original vector, as illustrated in the following equations:

$$W = (w_1, w_2, w_3, w_4, \ldots, w_n)$$

$$|W| = \sqrt{(w_1^2 + w_2^2 + w_3^2 + w_4^2 + \ldots + w_n^2)}$$

$$W_{norm} = \left(\frac{w_1}{|W|}, \frac{w_2}{|W|}, \frac{w_3}{|W|}, \frac{w_4}{|W|}, \ldots, \frac{w_n}{|W|}\right)$$

This is only one example of normalization. As those familiar with the art are aware, other well-understood possibilities can be used. The result of the normalization operation is a set of one or more normalized document vectors that represent the pattern of concepts identified within each document.

The normalized document vectors are typically stored along with the predicate structures for that document at the time the documents are originally parsed by the ontological parser. As a result, efficiency is increased since the vectors do not have to be repeatedly constructed with each access to the document.

In addition to the document contents, vectorization must be performed on the user query by the query vectorization unit 134. However, this can present a problem because a user query will typically consist of only one or possibly a few conceptual predicate structures compared to the many predicate structures found in a typical document. As a result, while the normalized document vectors may reflect perhaps 50 or 100 predicate structures, the user query may have as little as a single predicate structure to work with.

In this case, the query predicate structure or structures are repeated enough times to make up the total number of elements needed to construct a vector of exactly the same dimensionality as the normalized document vectors. Like the document vectors, the query vector must be normalized; this is done using the same normalization process used in normalizing the document vectors. The final result is a normalized query vector.

If the query has more than one predicate structure, multiple query vectors can be constructed with the individual query predicate structures in various orders. Thus, if the query consists of two predicate structures, A and B, two query vectors can be constructed, one with the predicate structures ordered as (A, B, A, B, ..., A, B)

and one with the predicate structures ordered as (B, A, B, A, ..., B, A)

The vector matching unit and the document clustering component can then operate on each of these query vectors in turn.

Relevancy ranking, the second major component of the relevancy ranking and clustering method and system, is a process that produces a set of documents sorted or ranked, according to certain criteria. The relevancy ranking process, according to the present invention, uses a similarity comparison algorithm to determine the relevance of a document to a query. One or more query predicate structures are generated using an ontological parser to parse input queries. One or more document predicate structures similarly are generated using an ontological parser to parse the set of known documents. Each query predicate structure is compared with each document predicate structure to determine a matching degree, represented by a real number. A multilevel modifier strategy is used to assign different relevance values to the different parts of each predicate structure match to calculate the matching degree of each predicate structure. The relevance of a document to a user's query is determined by calculating the similarity coefficient, based on the structures of each pair of query predicates and document predicates.

The relevancy ranking unit comprises multiple components that perform different levels of similarity comparison. The first component is a predicate vector matching unit that dynamically compares the coarse-grained overall pattern of predicate structures for each document to those of the user query and returns a ranking by predicate pattern similarity. The second component is a predicate structure matching unit that compares two predicate structures and returns a similarity measure. The third component is a predicate matching unit that compares the similarity between the predicate parts of two predicate structures and returns a similarity measure. The fourth component is an argument matching unit that compares the argument parts of two predicate structures and returns a similarity measure. The fifth component is a concept matching unit that compares two concepts and returns a similarity measure. Finally, the sixth component is a proper noun matching unit that compares two proper nouns and returns a similarity measure.

The relevancy ranking unit considers a set of factors that impact the ranking algorithm, and implements a multiple-level modifier strategy to adjust the weight of each factor.

There are six steps in the relevancy ranking method of the present invention. First, a group of candidate documents 120 are sent to the ontological parser 122. Second, the ontological parser 122 parses each document 120 and generates one or more predicate structures for each sentence in the document. The set of predicate structures from a document 120, along with one or more document vectors produced by the document vectorization unit 130 are stored in a document predicate storage component or library 124. The document predicate library contains a formal representation of the document 120 by storing the set of predicate structures representing the sentences in the document 120. The document predicate library for each candidate document 120 is stored in a document predicate storage component 124 and can be retrieved by a primary key. Third, an input query 118 is sent to the ontological parser 122. Fourth, the ontological parser 122 parses the input query 118 and generates one or more predicate structures. All predicate structures from the input query 118 are represented in a query predicate library that is stored in a query predicate storage component 126. Fifth, a query predicate library (representing an input query 118) and a set of document predicate libraries (representing a set of documents .120) are sent to the relevancy ranking component 128 to compare the similarity level between an input query 118 and the documents 120. Documents 120 are then ranked in the order of their similarity levels. Sixth, the documents 120 are returned in ranked order.

The vector relevancy matching component of the relevancy ranking unit provides an efficient, computationally concise ranking of the documents based on the predicate structures from those stored for the documents 120. This matching technique uses primarily the predicate portions of the stored information, and thus does not do fine-scale ranking. It makes use of the vectors produced by the document vectorization unit 130 and the query vectorization unit 134 to perform its ranking operations.

The operation of the vector matching unit is illustrated in FIG. 2. It comprises the steps of constructing a vector of the user query 134, retrieving the vectors representing the documents 130 that need to be ranked from the document predicate library, performing a dot-product operation between the user query vector and each of the document vectors 132, ranking the documents in order of the dot-product result, from largest value (most relevant) to smallest value (least relevant), and returning the rankings.

The predicate vector matching implemented by the relevancy matching component has the following inputs:

Query_predicateLibrary: a query predicate library structure representing an input query and containing all predicate structures generated by the ontological parser from parsing the input query, and Doc_predicateLibrary: a document predicate library structure containing the set of predicate structures representing the sentences in the natural language source document.

Query predicates are converted into a queryvector. For each document inside the Doc_predicateLibrary the corresponding documentvector(s) are retrieved. The dot product of the queryvector and the documentvector is computed. The matching_score is made equal to the dotproduct. The document is inserted into the ranking list, with the highest dot-Product values first, and the lowest dotProducts last.

The output of the predicate vector matching algorithm is a ranked list of documents with the closest-fit documents at the top of the list and the worst fit documents at the bottom of the list.

For more fine-grained relevancy ranking, other techniques used by the relevancy ranking component are used to perform one-to-one comparisons of the predicate structures within the documents to the predicate structures within the query. These other techniques are explained next.

Since both input queries and documents are converted into one or more predicate structures, the similarity between an input query and a document depends on the similarity between query predicate structures and the document predicate structures. There are different strategies for matching two predicate structures when they are similar but do not exactly match.

As described previously, a predicate structure consists of a predicate, which is either a verb or a preposition, and a set of arguments, which may be any part of speech. Two predicate structures can be matched, in the predicate matching step 136, by comparing their verbs in a verb (preposition) only match, where only the predicate part (usually a verb or a preposition) of two predicate structures is compared. A noun match may be performed if two predicate structures do not match in their predicate part, wherein their respective arguments are compared for matching nouns. A verb and noun match compares the whole predicate structure.

In order to precisely determine the information converted by the predicate structure, a multiple level modifier strategy 138 is implemented to adjust the weight for each factor that modified the information converted to the predicate structure. Modifiers are defined based on a number of factors.

One factor is the predicate structure abstraction level. The predicate structure abstraction is represented by the predicate structure match type. A "Verb Only Match" is more abstract than a "Noun Match." Similarly, a "Noun Match" is more abstract than a "Verb and Noun Match." The parameters VerbOnlyMatchModifier, NounModifier and VerbNounMatchModifier are defined to adjust the weight of different predicate structure abstraction levels. The more abstract a match type, the smaller the weight it receives.

Another factor is concept proximity, which represents the ontological relationship between two concepts. Each concept in a parse tree can be represented as an integer. The smaller the difference between two concepts, the closer their ontological relationship is. The closer the ontological relationship, the higher the relevancy bonus. For two exactly matched concepts, the parameter ConceptExactMatchModifier adjusts the weight. The parameter ConceptProximityModifier adjusts the weight for two concepts that are not exactly matched. Each concept node in the ontology hierarchy tree has a unique integer identifier, and all of these numbers have the same number of digits. Thus, the value of identifier_digit_number represents the number of digits the integer identifier has, and the variable highest_order_difference_digit represents how many digits the difference between two concepts has. The modifier weight for ConceptProximityModifier is defined as $$ConceptExactMatchModifier \times \left(1 - \frac{\text{highest\_order\_difference\_digit}}{\text{identifier\_digit\_number}}\right)$$

Sentence position is another factor, which postulates that sentences appearing early in a document may contain the title or abstract of a document, and predicates containing the title or abstract will have a higher information content. FrontLineModifier is defined for predicate structures representing one of the first ten sentences in a document.

Another factor is the degree of proper noun matching. This factor considers the similarity between two proper nouns. ProperNounExactMatchModifier is defined to modify the matching degree between two exactly matched proper nouns, and SymbolMatchModifier is defined to modify the matching degree between two proper nouns in which one is the symbol of the other.

Word stem is a factor that takes in to consideration whether two words are from the same word stem. For example, the word "sleeps" and "sleepy" have the same word stem, "sleep." SameStemModifier is defined to adjust the matching degree of two words having the same word stem.

Document size is a factor that takes into account the size of a document. A DocSizeModifier parameter is designed to prevent a large number of predicate occurrences in a document from over-weighting the matching score. A short document containing 10 instances of a query predicate structure will be given a higher weight than a much longer document with 10 instances of the same query predicate structure.

Table 1, shown in FIG. 3, sets forth an example of modifier name, default weights, and an explanation of each. The default weights shown are just examples to show the relative magnitude of each modifier. Actual weighting parameters are defined experientially.

The similarity comparison process implemented by the relevancy ranking component determines the similarity between a query and a document. The inputs to this algorithm are:

Query_predicateLibrary: a query predicate library structure representing an input query and containing all predicate structures generated by an ontological parser from parsing the input query, Doc_predicateLibrary: a document predicate library structure containing the set of predicate structures representing the sentences in the natural language source document, and Match_type: a representation of the predicate structure match type.

The output of this algorithm is a real number representing the similarity level between a query and a document.

Figure 4:
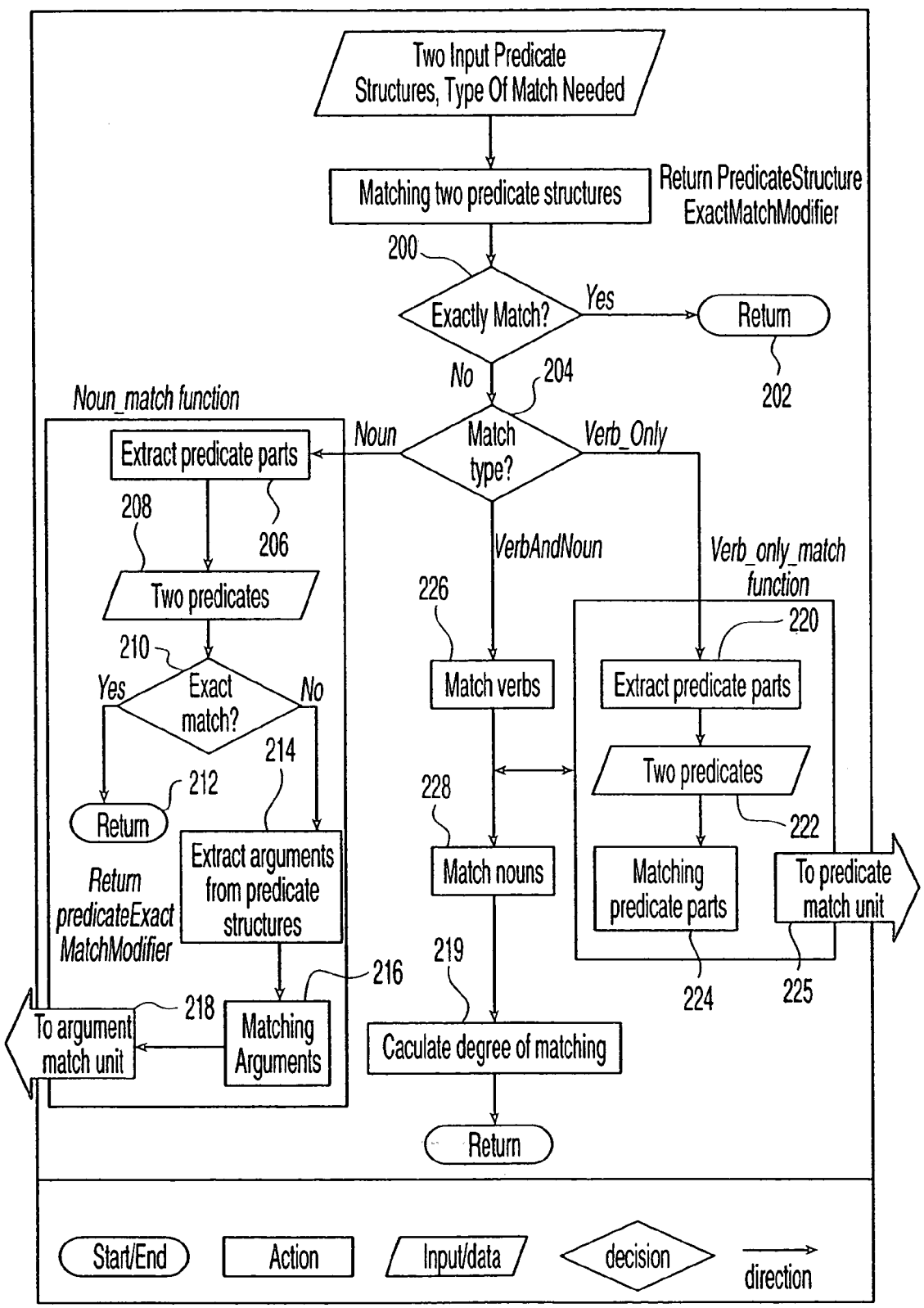
FIG. 4 is a flow chart illustrating the predicate structure matching function according to the present invention.

FIG. 4 is a flow chart that describes how the predicate structure matching component determines a matching degree between two predicate structures. Two input predicate structures are compared in block 200. If they match exactly the result is returned to the user in step 202. If the two predicate input structures do not match exactly the degree or type of match is determined in step 204.

If a noun match is desired, the predicate parts are extracted in step 206 to provide two predicates 208. If the two predicates 208 match in step 210 the result is returned in step 212. If the two predicates 208 do not match the arguments are extracted from the predicate structures in step 214, and the arguments are matched in step 216. Matching arguments are sent to an argument matching unit and to the degree of matching calculation step 218.

If only a verb match is desired, the predicate parts are extracted in step 220 to provide two predicates 222. If the two predicate parts 222 match in step 224 the matching predicates are sent to a predicate matching unit in step 225 and to the degree of matching calculation step 218.

If both verb and noun matches are desired, the verbs are matched in step 226, and steps 220 to 225 are followed. The nouns are then matched in step 228, and steps 206 to 218 are followed. Furthermore, after the noun matching step 228 and the verb matching step 224, the degree of matching is calculated in step 219.

The procedures to determine the degree two predicate structures match are described below. A determination is made whether the two predicate structures are an exact match, namely do the query predicate structure and the document predicate structure match exactly. If there is an exact match then the matching degree is set to equal the predicate Structure Exact Match Modifier. If the two predicate structures do not match exactly then a determination is made of the matching degree based on the input predicate structure match type.

If only the verbs match, the value $S_{verb}$ is set to equal verb_only_match between the query predicate structure and the document predicate structure. The matching_degree is then set equal to the product of the VerbOnlyMatchModifier and the $S_{verb}$.

If only the nouns match, the value $S_{noun}$ is set equal to noun_match between the query predicate structure and the document predicate structure. The matching_degree is then set equal to the product of the NounOnlyMatchModifier and $S_{noun}$.

If both the nouns and verbs match, the value $S_{verb}$ and $S_{noun}$ are set to equal verb_only_match and noun match, respectively, between the query predicate structure and the document predicate structure. The matching_degree is then set equal to the product of the NounOnlyMatchModifier and $S_{noun}$. plus $S_{verb}$.

When only the verbs of the two predicate structures match, the matching function is as follows. First, the predicate part is extracted from each predicate structure to generate two predicate objects, query_predicate and doc_predicate. Second, the two extracted predicate objects are sent to a predicate match unit, which returns a matching score of the two predicates.

When only the nouns of the two predicate structures match, the matching function is as follows. First, the predicate part from each predicate structure is extracted and two predicate objects are generated, query_predicate, doc_predicate. Second, a determination is made as to whether the two predicate objects exactly match. If the two predicate structures exactly match, the score is set equal to the predicate Exact Match Modifier. Otherwise, arguments are extracted from each predicate structure and two argument lists, query_argument_list and doc_argument_list are generated. The two argument lists are then sent to an argument matching unit, and a matching score for the two argument lists is returned.

Figure 5:
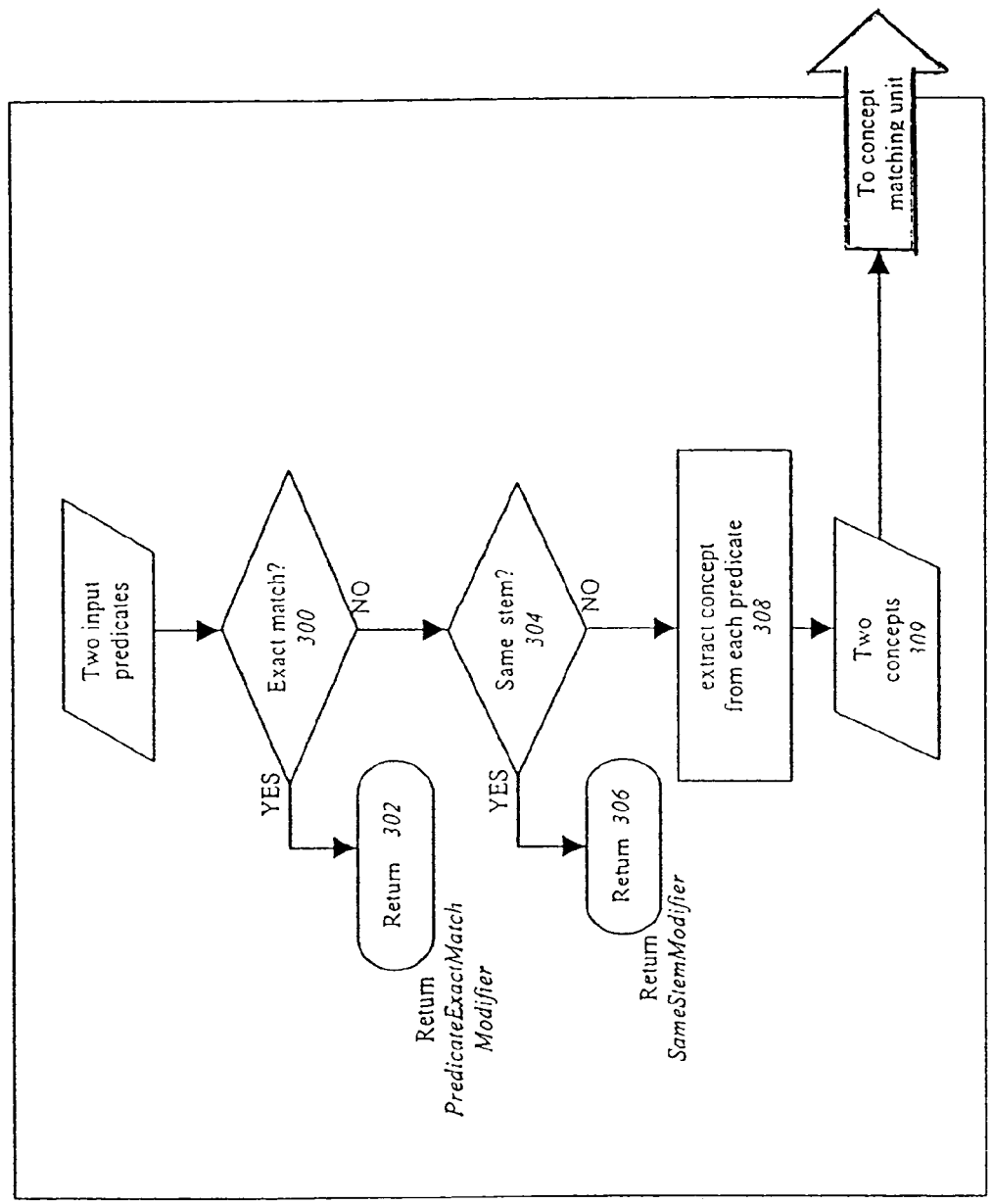
FIG. 5 is a flow chart illustrating the predicate matching process according to the present invention.

FIG. 5 is a flow chart showing how the predicate matching component determines the degree two predicates match. A determination is made in step 300 whether the two predicates exactly match. If the answer is yes, the score is set to the predicateExactMatchModifier and returned in step 302. If the two predicates do not match exactly, in step 304 a determination is made as to whether the two predicates are from same stem. If the two predicates are from the same stem the score is set to the SameStemModifier and returned in step 306. If the two predicates are not from the same stem, a concept is extracted from each predicate object in step 308, and a pair of concepts 309, query_concept and doc_concept, are generated. The two concepts are sent to a Concept Matching Unit, and concept matching score is returned, where the score equals match_concept (query_concept, doc_concept).

Figure 6:
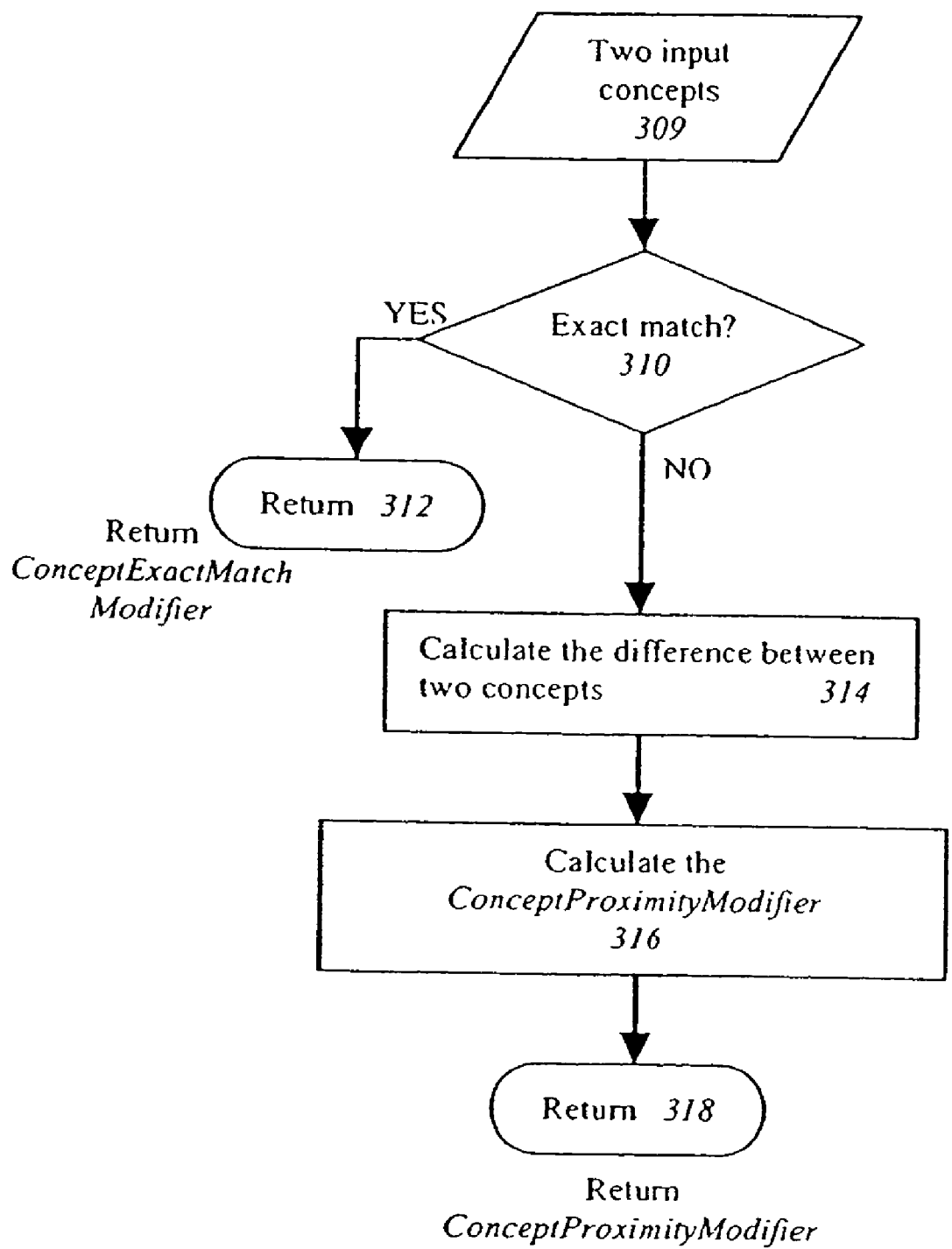
FIG. 6 is a flow chart illustrating concept matching according to the present invention.

FIG. 6 is a flow chart that describes how the concept matching component determines the degree two concepts match. In step 310 a determination is made whether the two input concepts 309 match exactly. If the result of step 310 is positive, the score is set equal to the ConceptExactMatchModifier and returned in step 312. If the result of step 310 is negative, the difference between the two concepts is calculated in step 314, with the highest order digit of the difference between the numerical representation of the query_concept in the ontological tree structure and the numerical representation of doc_concept in the ontological tree structure. The ConceptProximityModifier is calculated in step 316 by dividing the ConceptExactMatchModifier by the difference between the two concepts. The resulting score is returned in step 318.

Figure 7:
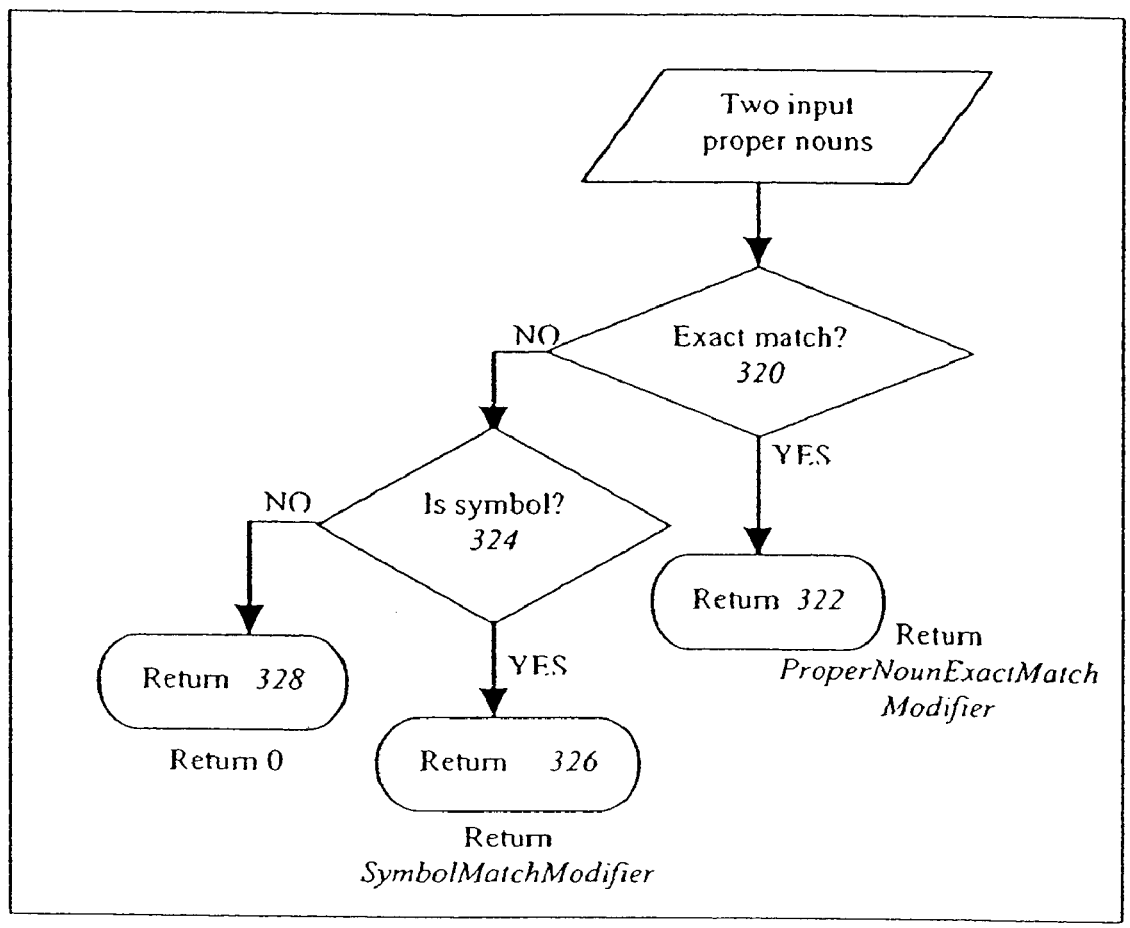
FIG. 7 is a flow chart illustrating proper noun matching according to the present invention.

FIG. 7 is a flow chart describing how the proper noun matching component determines a matching degree between two proper nouns. A determination is made whether the two input proper nouns exactly match in step 320. If the result of step 320 is positive the score is set equal to the properNounExactMatchModifier and returned in step 322. If the result of step 320 is negative, a determination is made whether either proper noun is a symbol for the other proper noun in step 324. If the result of step 324 is positive, the score is set equal to SymbolMatchModifier and returned in step 326. If the result of step 324 is negative, a score of 0 is returned in step 328.

Figure 8:
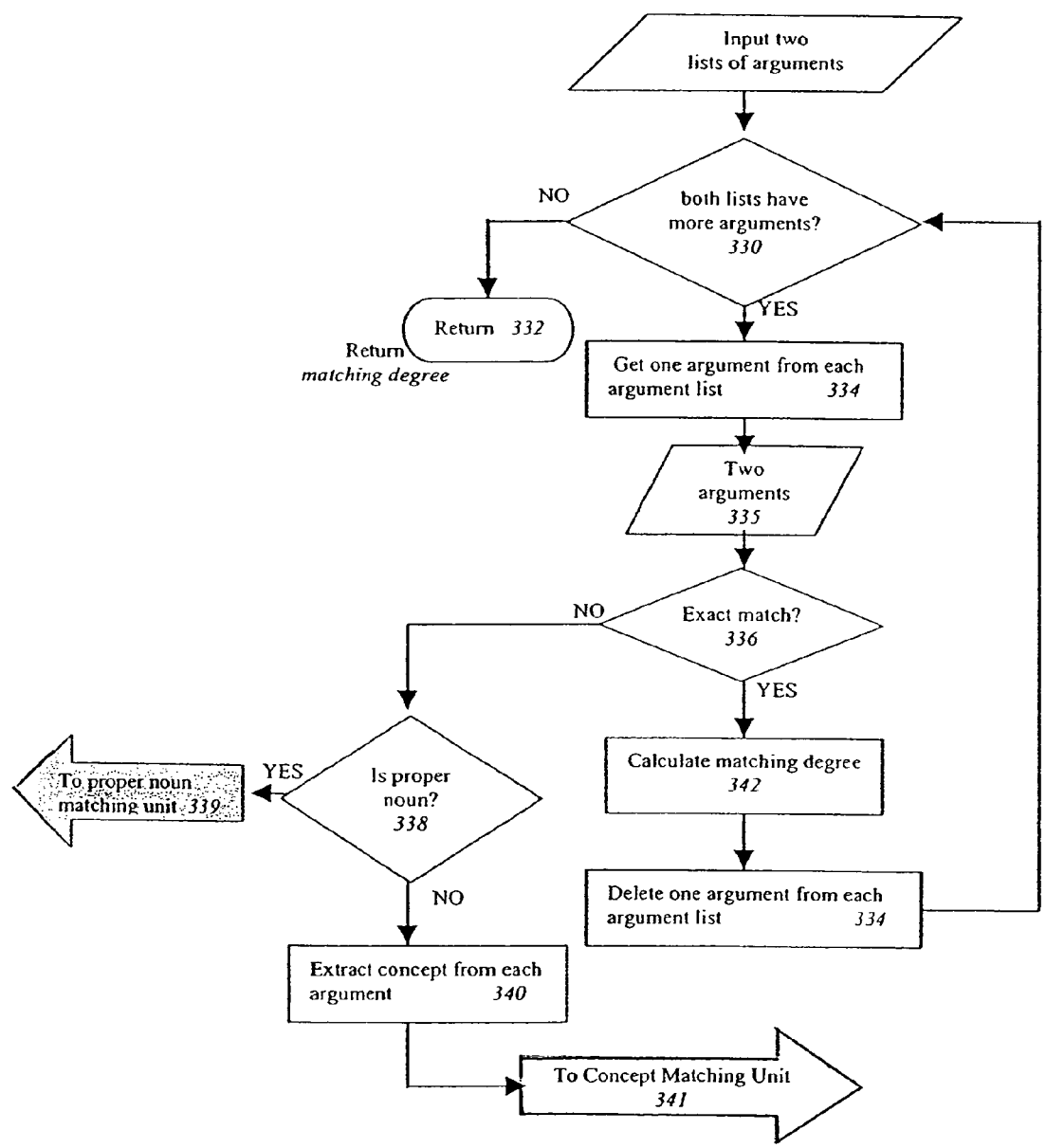
FIG. 8 is a flow chart illustrating argument matching according to the present invention.

FIG. 8 is a flow chart that describes how the argument matching component determines a matching degree between the arguments of two predicate structures. Iteration is performed through both lists as long as both have more arguments in step 330. If both lists have no more arguments then the current computed value of matching degree is returned in step 332. If both lists have more arguments, one argument from each list is retrieved to generate two arguments, a query argument and a document argument in step 334. The two arguments 335 are checked to determine if they match exactly in step 336. If the two arguments match exactly a matching degree is calculated in step 342, and an already processed query argument is deleted from the query argument list in step 344. The process then returns to step 330 to determine if both lists still have more arguments.

If the result of step 336 is negative, a determination is made whether the two arguments are both proper nouns in step 338. If both arguments are proper nouns, the concepts are sent to the proper noun matching unit in step 339. If both arguments are not proper nouns, concepts are extracted from each argument, and two concepts are generated in step 340. The two concepts are then sent to a concept matching unit in step 341.

The third major component in the relevancy ranking and clustering method and system is the document clustering component. In any sufficiently extended document space, it is likely that generally worded queries will result in far too many exact or nearly exact matches. It is commonly found that users who are presented with a long list of matches from a document retrieval process rarely look past the first 25 or 30 such matches. If the list exceeds that length, all other matches will be ignored. Yet it is also true that a query worded with too much generality can easily retrieve many times that number of documents from even a moderately large search space, all of which conceivably provide an exact predicate match for the user query. In these cases, the document clustering component is used to further distinguish the found documents and identify the exact ones that provide the requested information.

The document clustering component comprises a self-organizing neural network that self-organizes based on the set of documents returned by the relevancy ranking unit as being exact or near-exact matches to the user query. The self-organization results in the identified documents being clustered based on their patterns of predicate pairs as discovered during the search process. The document clustering component then compares the user query predicate structure to the resulting self-organized map, identifying clusters of documents that are most likely to fit the user's intent. The document clustering component provides a feedback mechanism by which users can determine if the identified cluster(s) of documents are good fits. This process also rapidly focuses on the correct cluster, whether or not the originally chosen cluster is correct.

The purpose of the document clustering component is to identify the exact documents desired by the user with the greatest possible confidence and the minimum possible time and effort on the part of the user. In effect, the document clustering component organizes returned documents into similarity clusters, which clusters are themselves organized by similarity. This organization and clustering process is performed automatically, without the need for humans to determine content or topic for the clustered documents.

Users may direct attention to one or a subset of clusters, and the document clustering component can thus rapidly and efficiently return only those documents desired, even when the original user query was too broadly worded to accurately focus the search effort.

The document clustering component operates in two modes. In the self-organization mode it adapts to the collection of identified documents matching a specific search effort. In the cluster retrieval mode it identifies appropriate cluster(s) of documents and returns them to the user, thus refining the search effort to more specifically respond to the user's needs.

Document clustering using the document and query vectors produced by the previously described vectorization techniques achieves several key advantages. First, it takes advantage of the basis for proximal concept co-occurrence in a more effective way than looking for simple word repetitions. Often authors of documents try to avoid too much repetition of the same term because human readers perceive such a writing style as repetitious and boring. Thus, a document dealing with housing might refer to "abodes," "houses," and "residences" within a single sentence or paragraph. Simple proximal word co-occurrence does not acknowledge that these are virtually the same concept. The use of ontology-based conceptual predicates identifies all such terms as identical or with numerical representations that vary only slightly from each other. Thus the notion of proximal concept co-occurrence provides much greater power than the simpler proximal word co-occurrence used in other systems.

The second key advantage notes that frequency of concept is clearly related to importance within a discussion. Because the normalized query vector, in effect, repeats the query concept or concepts many times, it can identify similar concepts located throughout the normalized document vectors. As a result, documents that have a high frequency of occurrence of the query concept are more likely to be returned by the document clustering component than documents that mention the query concept only rarely.

A further advantage of this vectorization technique is that it reflects the reality that a given query concept may appear in many possible positions within the document, not merely in the first sentence, or even the first paragraph. The replication of the query concept throughout the query vector in effect checks for this concept in almost every possible location within the document. There thus is no penalty to documents that have the relevant discussion further down in their text. Those documents that are the most relevant-documents containing discussions of the query concepts more frequently-are returned.

These two modes make use of any of several self-adaptive neural network structures. A neural network is a computational system that uses nonlinear, non-algorithmic techniques for information processing. Although the neural network structure specified herein is illustrative of the type of neural network architecture and learning algorithm that may be used in this component, the scope of the present invention is not intended to be limited to the specific embodiment disclosed herein, as alternative embodiments will be obvious to one skilled in the art. For example, one or more aspects of the present invention may be computer executable instructions stored on one or more computer readable media.

Figure 9:
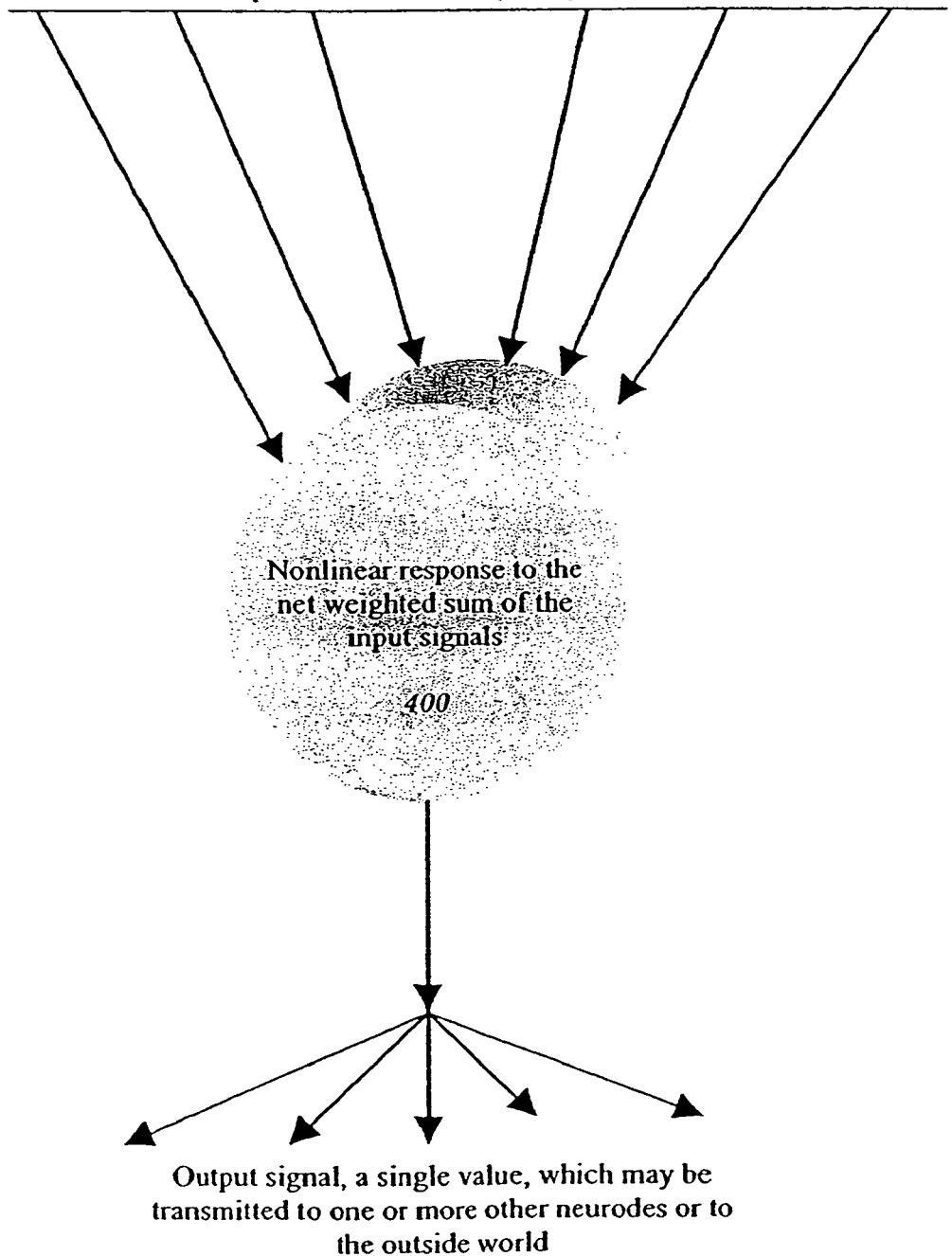
FIG. 9 is a diagram illustrating an individual neurode according to the present invention.

A neural network generally consists of a large number of simple processing elements, called neurodes 400 herein. FIG. 9 illustrates a single neurode 400. The neurodes 400 receive input signals along one or more individually weighted and individually adjustable incoming connections, and generate a single, nonlinear response signal which is transmitted to one or more other neurodes, or to the outside world, via a separate set of individually weighted connections.

Figure 10:
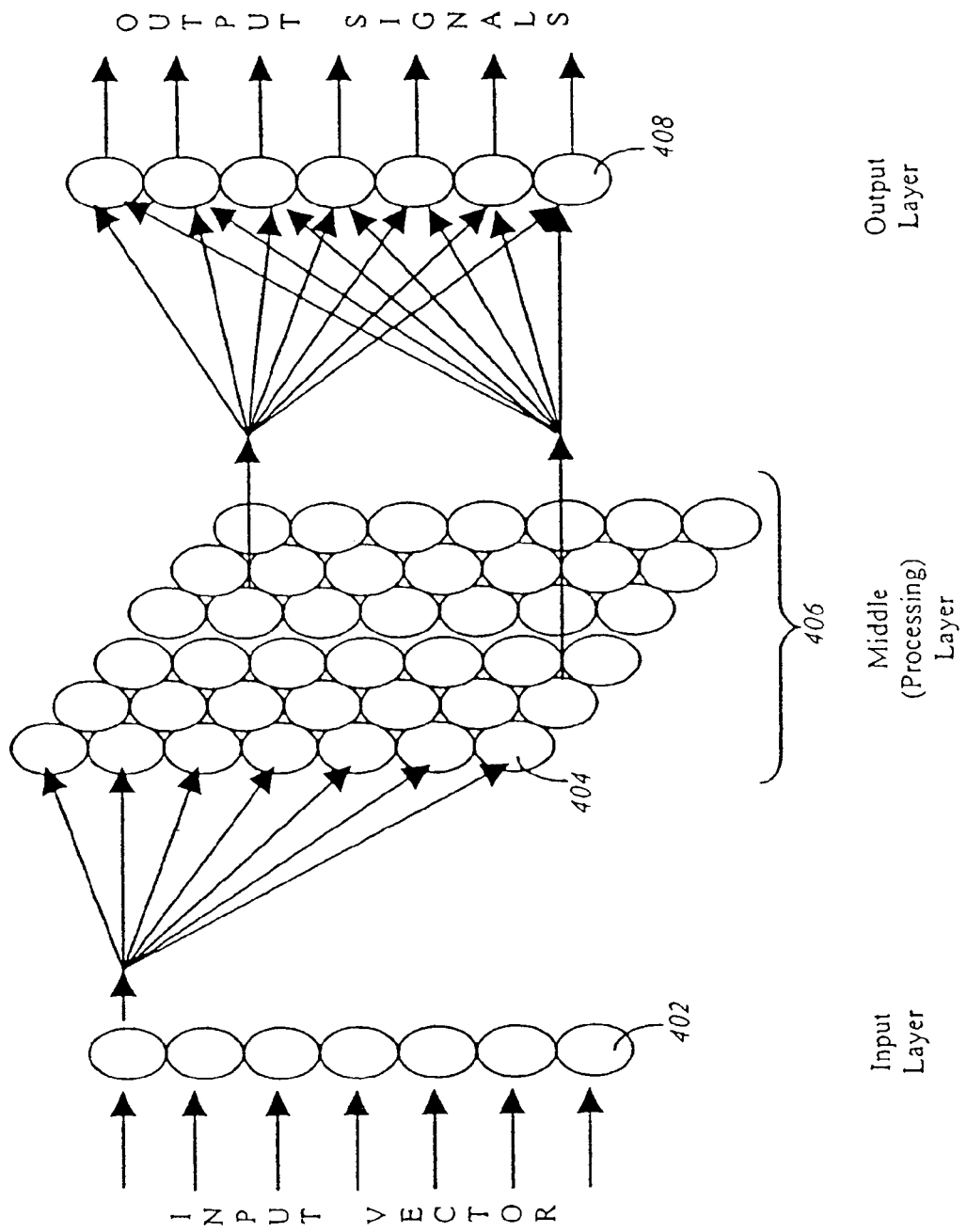
FIG. 10 is a diagram illustrating a general neural network according to the present invention.

Typically, the neurodes 400 of a neural network are organized into layers as illustrated in FIG. 10, with the primary communication among neurodes 400 being interlayer; i.e., the neurodes 400 of the first, or input, layer 402 transmitting their outputs to the inputs of the neurodes 400 of the second layer 404, in the middle processing layer 406, over individually weighted connections, and so on. The effectiveness of the transmission of signals into a neurode 400 depends on the weight of the connections over which the signals travel. A positively weighted (excitatory) connection tends to increase the activity of the receiving neurode 400 and thus increase the resulting output from that receiving neurode 400. A negatively weighted (inhibitory) connection tends to decrease the activity of the receiving neurode 400, and thus decrease the resulting output from that receiving neurode 400. The process of training the neural network consists of establishing an appropriate set of weights on these connections so that the overall response of the network to input signals is appropriate. The neural network emits output signals through the output layer 408.

Figure 11:
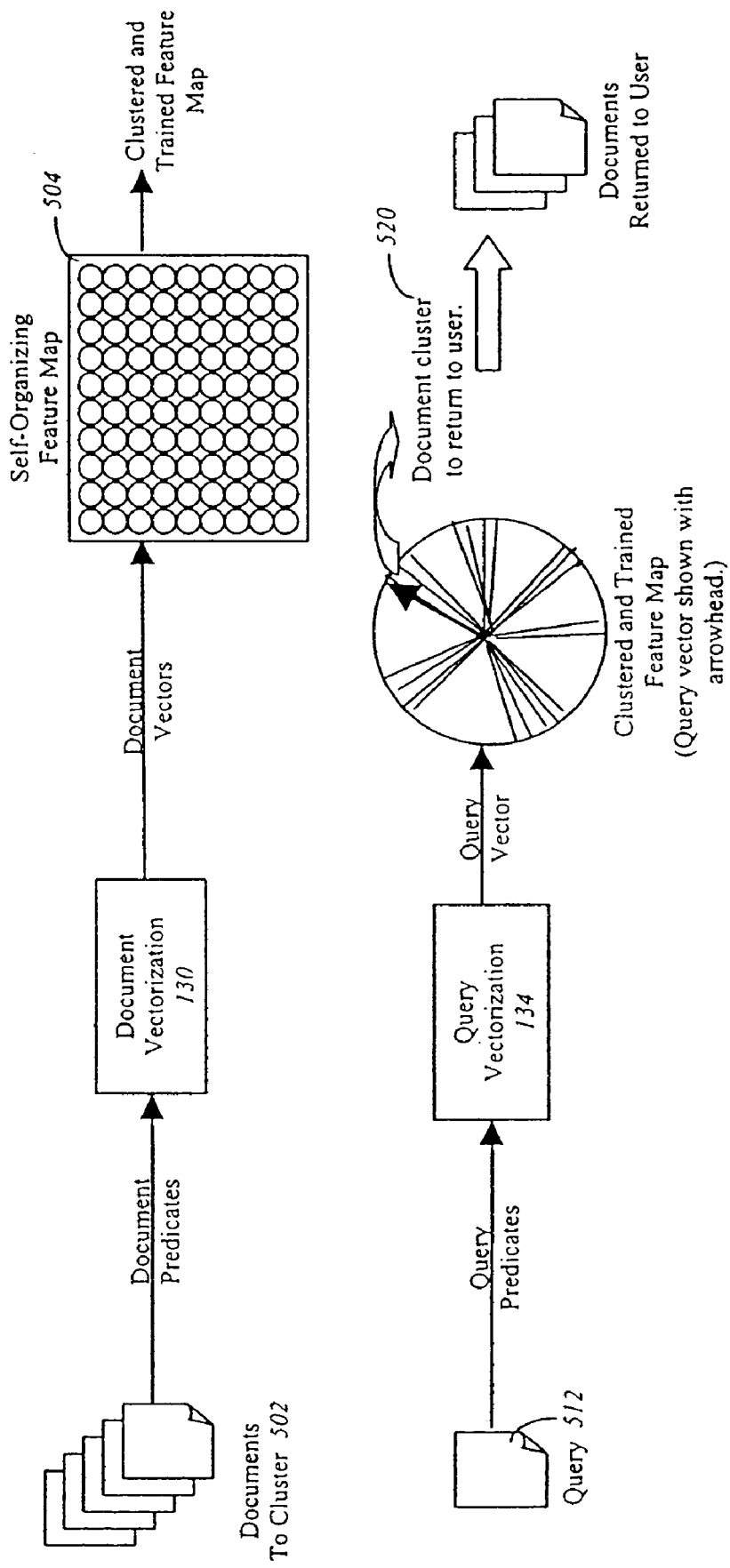
FIG. 11 is a block diagram illustrating the document clustering component according to the present invention.

FIG. 11 provides a block diagram of the process of clustering documents using the document clustering component. As shown in FIG. 11, the process includes three steps, namely, document vectorization 500 of the documents in the set 502 to be clustered, query vectorization 510 of the original user query 512, and training the document clustering component on the vectorized documents, user interaction and feedback to determine the appropriate cluster(s) of documents to return to the user 520.

Once the document set 502 is vectorized, training can begin. (As noted in the previous section, the vectorization step is normally done at the time the document is placed in the document predicate storage 106.) Training occurs using a self-organizing feature map 504 of arbitrary size. Typically, the size of the map 504 will be determined based on (a) the number of categories desired as determined by pre-established system parameters; (b) the size of the document set 502; and (c) the desired granularity of the categories. The number of neurodes in the feature map 504 can either be fixed as a system parameter, or dynamically determined at the time the map is created.

Once the feature map is prepared, the final step is to determine which cluster or clusters should be returned to the user, and which document within that cluster should be specifically used as an example. As noted previously, several techniques exist to make these decisions, and the best one will be predicated on the needs of the specific application. One technique is discussed herein to illustrate how this process is performed, however, it is not meant to limit the scope of the present invention.

One useful method to determine the cluster and document is to make use of the query vector produced in the vectorization process. The normalized query vector is applied to the feature map, in the same manner as the document vectors were. The neurode with the weight vector that produces the largest dot-product computation with this query vector is the "winner." That neurode has a list of associated documents produced during the final processing stage of training. Those documents (in a very large document set) are the cluster most closely associated with the concepts in the query. Thus, that cluster is the one that should be presented to the user. In a smaller document set, the documents from that neurode and its immediately neighboring neurodes constitute the winning cluster.

It is also possible to present the user with several choices of clusters by retrieving the cluster that the query most closely matches, and one or more clusters represented by neurodes at greater distance from the winning neurode. For example, if the system is set to return four clusters for the user to select among, the winning neurode defines the first cluster, and the remaining three clusters are represented by neurodes approximately equally spaced throughout the physical network. Clearly, any desired number of cluster choices can be selected, up to the total number of neurodes within the self-organizing layer, depending on system application and utility. The result, no matter how many clusters are chosen, is a small set of documents that effectively spans the conceptual space of the document set.

As shown in FIG. 11, the document clustering component makes use of the document vectors previously generated by the document vectorization unit 130, and the previously generated user query vector or vectors generated by the query vectorization unit 134. With these inputs, the document clustering component performs the steps of self-organization of the document clustering component, and cluster retrieval from the trained network.

In one implementation of the self-organizing network described, the network's key processing layer, called the self-organizing layer, includes connections not only to other layers, but also to other neurodes within the self-organizing layer. The activity of the self-organizing layer is mediated by a secondary competition effect.

The intralayer, i.e., from a self-organizing layer neurode to other neurodes within that layer, connections mediate the competition. Weights on the intralayer connections between two arbitrary neurodes vary with the physical distance between the neurodes so that immediate physical neighbors generate positive, stimulating signals (i.e., over positively weighted connections), while neighbors further apart generate negative, inhibitory signals (i.e., over negatively weighted connections). Those neurodes at the farthest distances (such as neurodes along the physical edges of the layer of neurodes) provided a slight positive stimulation. The net effect is that an input signal arriving at the self-organizing layer results in an intralayer competition that ensures a single, best-match neurode wins. Only that winning neurode generates an output signal to pass on to the following layer of neurodes. In essence, the activity of all other neurodes is damped by the competition with the best-fit winning neurode.

Alternative implementations of such a self-organizing map as a computer program do not require exact simulations of such competition; it is enough that the end result is produced. For each input signal pattern, the only output signal comes from the single neurode that best matches that input pattern as determined by the dot product of the input pattern vector (normalized) and the corresponding (initially normalized) weight vector of the neurode.

Figure 12:
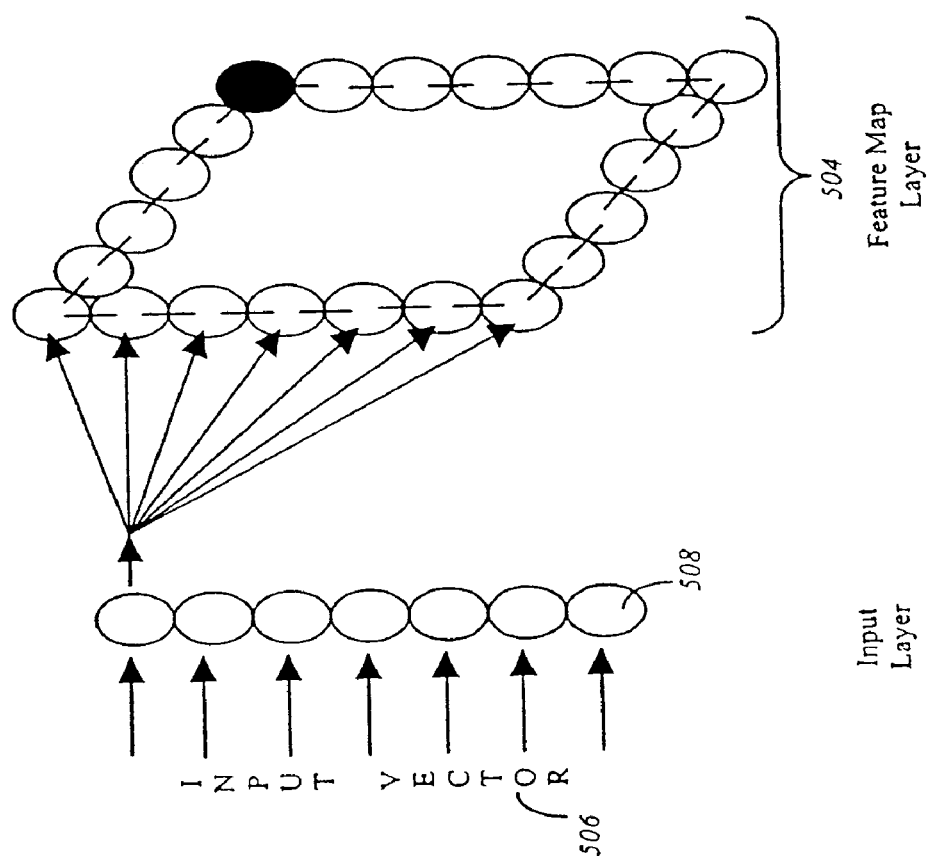
FIG. 12 is a document clustering component feature map according to the present invention.

FIG. 12 illustrates a typical configuration of the feature map 504. The intra-layer connections shown are present to illustrate the neighbor concept, but are not actually used as part of the training process. For simplicity and clarity in the diagram a 7-dimensional input vector 506 to an input layer 508 is shown, but in actual practice, the dimensionality of the input vector 506 is more likely to be in the range of 50 to 100. Dimensionality is a parameter that can be established based on specific application needs.

The overall geometry of the self-organizing layer is one of a continuous strand of neurodes. Immediate neighbors of each neurode are those on either side of it according to the virtual intra-layer connections shown. The size of the neighborhood around each neurode is a parameter that is varied in the course of training. Typically, the initial size of the neighborhood is fairly large so that as much as 25-50% of the total self-organizing layer constitutes the neighbor of any given neurode. As training proceeds, this neighborhood size is rapidly lowered until it reaches 1 or 0, at which point only the single winning neurode adjusts its weights.

The overall training process for a given set of document vectors, $D=\{I_1, I_2, \ldots, I_n\}$ includes initializing the self-organizing layer of the network. Initialization includes determining the size of the self-organizing layer, either from a fixed system parameter, or from dynamic considerations such as the total number of document vectors within D. For the following discussion, the size of the self-organizing layer is referred to as M.

An initial set of weight vectors is then established for each neurode in the self-organizing layer. These are the weights associated with the connections between the input layer and the self-organizing layer. Note that the dimensionality of these weight vectors is always exactly the same as the dimensionality of the document vectors since there is always exactly one input connection for each element of the document vectors. For the initial weight set, the M weight vectors are either set to random weights or to the first M input vectors in D.

When the total number of document vectors in D is very large, the second choice may be most appropriate, since the second choice guarantees that every neurode accurately reflects at least one input vector. However, in smaller document vector sets, the second choice can unfairly bias the self-organizing map toward those documents that (by chance) happen to occur early in the document set. The random process is safer, but somewhat more computationally expensive; setting the weights to members of the document vector set is computationally cheap but may impose some unwanted bias on the feature map.

Once the initialization is complete, the actual training process starts. An input vector In is applied to each neurode in the self-organizing layer. The closeness of the weight vector of each neurode to the input vector is determined by computing the dot-product of the two vectors. Next, the neurode with the largest result of the dot-product computation is determined and is declared the "winner." This computation is computed as:

$$I_n \cdot W_m = \sum_{i=1}^{k} I_{ni} W_{mi}$$

In this equation, the nth input vector and the mth neurode's weight vector are dotted. The dimensionality of each of these vectors is k (i.e., there are k elements in each of the input vector and the weight vector).

The formula for the dot product of an input vector I and a weight vector W is:

$$I \Box W = \Box I_i * W_i = |I| * |W| * \cos â$$

where the summation is taken over all elements i of the two vectors I and W, |I| is the length of the vector I (with corresponding meaning for |W|), and á is the angle in n-dimensional weight-space between the two vectors.

The weight vectors of the winner and each of its current neighbors, as determined by that neighborhood size are then modified based on the current (and dynamically changing) neighborhood size. The weight vectors are modified as follows:

$$W^{new}_m = W^{old}_m + â*(I_n - W^{old}_m)$$

Where â is a learning parameter between 0.0 and 1.0. Typically, this parameter is on the order of 0.25 or less, though its value may also be dynamically changed during the course of the training.

The process then continues to the next input vector, repeating the foregoing steps. Training proceeds and the neighborhood size is decreased until the complete document set is processed. For very large document sets, a single pass through the data may suffice. For smaller sets, the training process can be iterated through the document set as necessary.

Because this training is computationally extremely simple, it can be performed very quickly. Furthermore, the training process can begin even as the search process continues since documents can be incrementally added to the document set without loss of performance.

The foregoing process produces a self-organized feature map that has clusters of neurodes representing conceptual clusters of the documents in the feature set. Neurodes that represent documents that are conceptually near will themselves be physically near within the feature map (where "nearness" within the feature map is determined by the neighborhood distance within the network). One additional pass through the input vectors can now be done without doing further modifications to the feature map. The purpose of the final pass is to make a list of which documents correspond to which winning neurode in the final map. Thus, there is an internal list associated with each neurode that notes for which documents that neurode is the "winner."

The single winning neurode represents the best match between the input signal and the currently organized network's set of weight vectors. In n-dimensional weight-space, the input vector and the weight vector of the winning neurode most nearly point in the same direction (i.e., have the maximum cosine of the angle between the two vectors). The normalization of the input vectors (i.e., the stored document vectors) and initial weight vectors is important because this implies that the lengths of the corresponding input and weight vectors is constant to an arbitrary length, usually, though not necessarily, 1.0. This also implies that the normalization process used on the document and query vectors is the same normalization process that must be used on the weight vectors in the neural network. Additionally, issues of dimensionality and scale are avoided via the normalization procedure.

In a typical implementation of the neural network architecture, the winning neurode and, possibly, some of its immediate physical neighbors adjust their weight vectors according to any of several learning laws. The simplest of these is $$W_{new} = W_{old} + â*(I - W_{old})$$

where â is a parameter that may be varied during the course of the self-organization mode, but is in all cases between the values of 0.0 and 1.0. W is the weight vector being modified from its old values to its new values and I is the input vector for a particular input sample. The effect of such weight adjustment is to nudge the weight vectors of those neurodes that are adjusting their weights to positions fractionally closer to the position of the input vector in n-dimensional weight-space, where the fraction is determined by the value of a. If one visualizes the input vector and the various weight vectors as being distributed around a normalization hypersphere in n-dimensional weight-space, the weight adjustment moves the weight vector along a chord that stretches between the initial position of the weight vector and the input vector.

The determination of which, if any, of the winning neurode's physical neighbors should adjust their weight vectors according to this scheme is part of the self-organizing process. Typically, the initial number of the adjusting neighbors is a substantial fraction of the network as a whole, thus ensuring that all neurodes participate in the self-organizing process. As self-organization proceeds and additional input vectors are presented to the network, this number is reduced until only the winning neurode adjusts its weight vector.

With a sufficiently large collection of documents on which to self-organize, it is possible for the self-organization step to proceed in an incremental fashion, as potentially matching documents are identified and added to the document set. If the set of documents is moderate in number (though still too many to return to the user directly), the system can perform the self-organization step by iterating through the set of returned document vectors until an appropriate level of clustering is achieved.

The total number of clusters possible within the neural network is limited to the total number of neurodes in the self-organizing layer. This is a definable parameter and may vary depending on specific application needs.

Unlike other document search and retrieval systems, the present system considers the overall pattern of predicate structures across substantial portions of the document to determine the overall meaning of the document. The predicate structures derived from the ontological parser are combined into a moving window of fixed but arbitrary size, with each predicate structure providing a fixed number of input vector elements. The resulting input vector provides an encoding of the relationship of predicate structures to each other within the document. This pattern of predicates permits the document clustering component to self-adapt to the overall meaning of the documents being learned.

Because the documents used for training consist of those documents returned by the ontological parsing system as matches for the specified query, the training results in a clustering of the documents into "more similar" and "less similar" categories because the self-organizing neural network after training has the following characteristics:

- Documents with similar global content (as opposed to similar individual predicate structures) are represented within the network by neurodes that are physically near each other;
- Documents with dissimilar global content are represented within the network by neurodes that are physically far from each other;
- The clustering of neurode weight vectors approximately mimics the clustering of the input vectors representing the various documents used in training. Thus, documents from large, complex clusters will have many weight vectors representing that space, resulting in finer-detail of representation. Documents that are relatively rare in the training space will have fewer corresponding weight vectors representing them.
- The clustering of neurodes approximately mimics the probability distribution function of the set of document vectors.

Once the Document Clustering Component has produced a neural network trained to distinguish the documents returned by the earlier search effort, it is ready to be used to determine the exact document(s) needed by the user. This is done in cluster retrieval mode by presenting users with one or, possibly, a small selection of documents that represent the corresponding document clusters. Such documents are considered by the system as being "typical" of the documents within that cluster. Although additional processing of the clusters can be performed to further refine the separation, it is not necessary in most instances.

Users can determine whether the presented sample document or documents are either similar to the requested documents or not similar to the needed documents. Based on that selection, the appropriate document(s) are provided. In the case where the user indicates a presented document is similar to desired documents, documents within the selected document's cluster are returned to the user. When the user indicates a presented document is dissimilar to desired documents, one or more sample documents from one or more clusters far from the presented document are provided for similar rankings. Because the document clustering component has positioned the sample documents within similarity clusters, and because those similarity clusters are themselves arranged in order of similarity, it is a near-certainty that appropriate documents are returned to the user within one, or at most a few, iterations of this user selection procedure. The latter case will occur only when an extremely large set of documents is returned by the search effort.

The determination of the cluster from which to select a sample can be performed in a variety of ways, based on computational needs and other user-defined parameters. Typical methods include but are not limited to, returning one sample document from each cluster, returning one sample document from the cluster most closely matched by the user's original query, returning one sample document from only the largest cluster, and returning one sample document from a randomly selected cluster.

Any of the foregoing methods can be used, along with other suitable methods, depending on system performance requirements and user preferences.

The determination of the specific sample document to select from a cluster can also be made in a variety of ways, based on specific user and system needs. Typical choices include, but are not limited to, returning a random document from the cluster, and returning the document closest to the center of the cluster.

Returning a random document is computationally simple and would be applicable in situations where performance is a concern. The second method involves computing the center of the cluster of documents using any of several well-understood mathematical formulations, and then returning that document or documents which most closely match that center. The second method has the advantage of returning a "typical" document that accurately represents the contents of the documents in the cluster. The second method has the disadvantage of requiring considerably more computational overhead to determine the center, and then more computation to determine the document or documents closest to that center. The tradeoff is between efficiency and precision.

In an alternate method of query, users who are doing preliminary scope-of-the-subject searches can request sample documents from each cluster within the original query hits. Thus if the documents returned from the ontological parser fall into P clusters, the system can provide a sample document from each of those clusters to give users a sense of the scope of information about a query that is available within the original search space. The user may then choose to focus on a specific cluster of documents and ask for those only, or may request that a subset of clusters be returned, or may request that all documents be returned.

Presentation of the sample document to the user is done interactively. For each chosen cluster, one sample document is selected from that cluster. The sample document can be a random choice, or selected by any other means from the list of documents associated with that neurode. For example, if four clusters are selected, and the first document on each neurode's list is might be selected as the example document for that cluster. Information about each document may be presented to the user, as:

- A thumbnail image of the document;
- A full-size version of the document in a new window;
- The first few lines or sentences of the document;
- An embedded title and description of the document as encoded within the document itself; or
- Any other appropriate summary form.

The user can then request more documents like the sample document, documents very different from the sample document, or documents like the sample document, but with some new query attached. In accordance with one or more aspects described herein, processing user interactivity and presentation to a user may be implemented by one or more computer readable media storing computer readable instructions for implementing the same.

In the first case, the set of documents represented by that cluster are returned to the user. In the second case, documents from a cluster or clusters far from the original cluster (as represented on the self-organizing map) are presented in a repeat of the above interactive process. And in the final case, a new query vector is produced that combines the original query concepts with the added information from the revised query to produce a new query vector. This query vector is applied to the same self-organizing map to identify a new cluster of documents to present, in a similar process as described above.

The relevancy ranking and clustering method and system can be applied in a wide variety of information retrieval applications by combining the three elements of the method and system in different orders and combinations. As described herein, one or more aspects of a relevancy ranking and clustering method and system may be implemented by one or more computer readable media that store computer readable instructions for implementing the same. The single component that should always be applied first is the vectorization unit because it generates document and query vectors that are used both by the relevancy ranking unit and by the document clustering component. Depending on the goals of the application, however, the relevancy ranking unit and the document clustering component can be applied in various orders and combinations. FIGS. 13 through 16 illustrate the possible combinations for these components.

Figure 13:
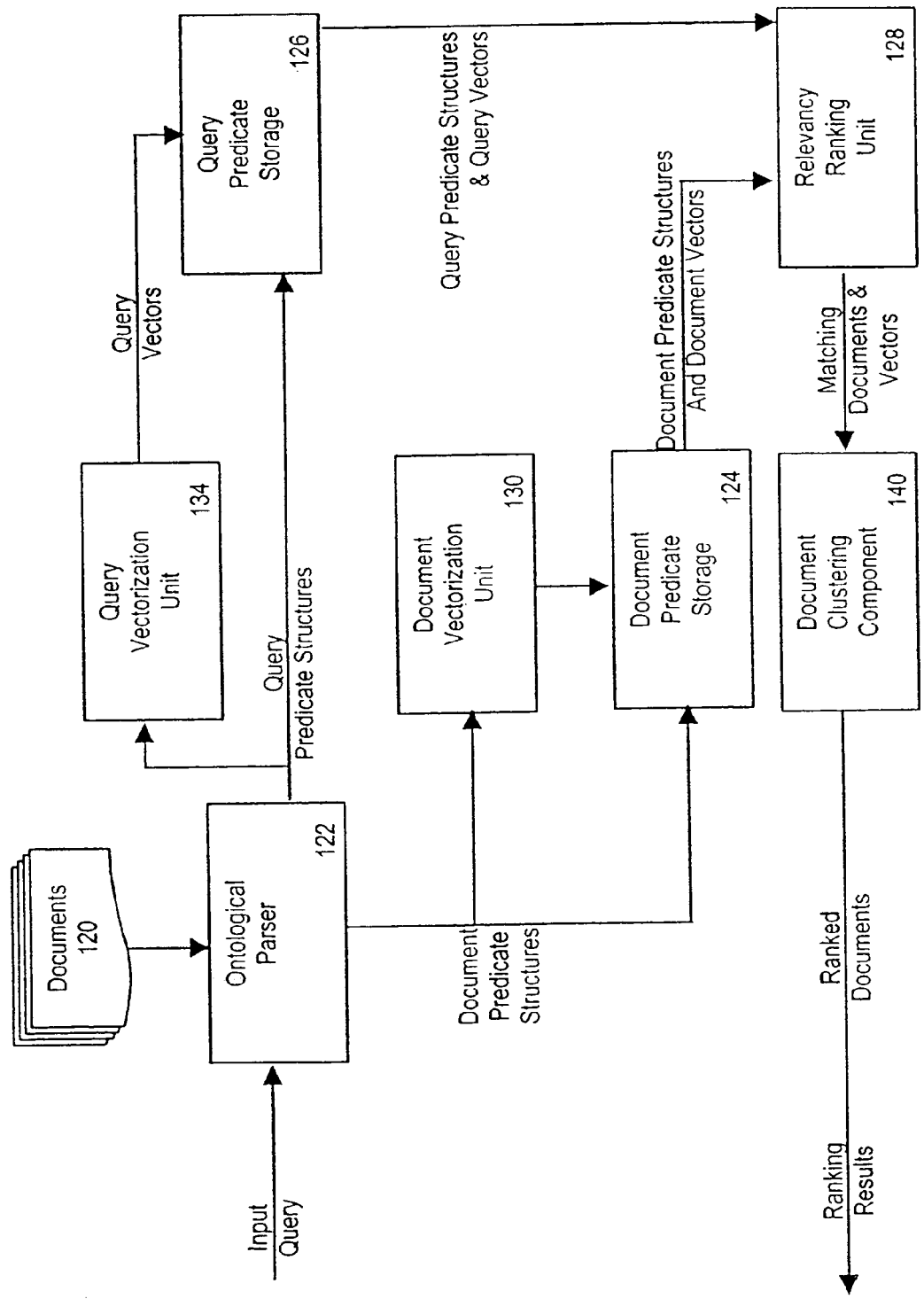
FIG. 13 is a block diagram illustrating the relevancy ranking component followed by the document clustering component according to the present invention.

In FIG. 13, the relevancy ranking and clustering method and system is applied as part of an information retrieval or search engine. Known parsed documents 120 are converted into vector representations by the document vectorization unit 130 and stored in a document predicate storage unit 124, along with the parsed predicate structures. When the user enters a query, it is similarly converted by the query vectorization unit 134 into a vector representation, which is stored in query predicate storage 126. The relevancy ranking unit 128 then uses these various representations of the documents and query to perform relevancy ranking on the documents. If too many documents are ranked very highly, the document clustering component 140 performs clustering on those highly ranked documents to determine which cluster or clusters most accurately represents the user's intent with the query.

Figure 14:
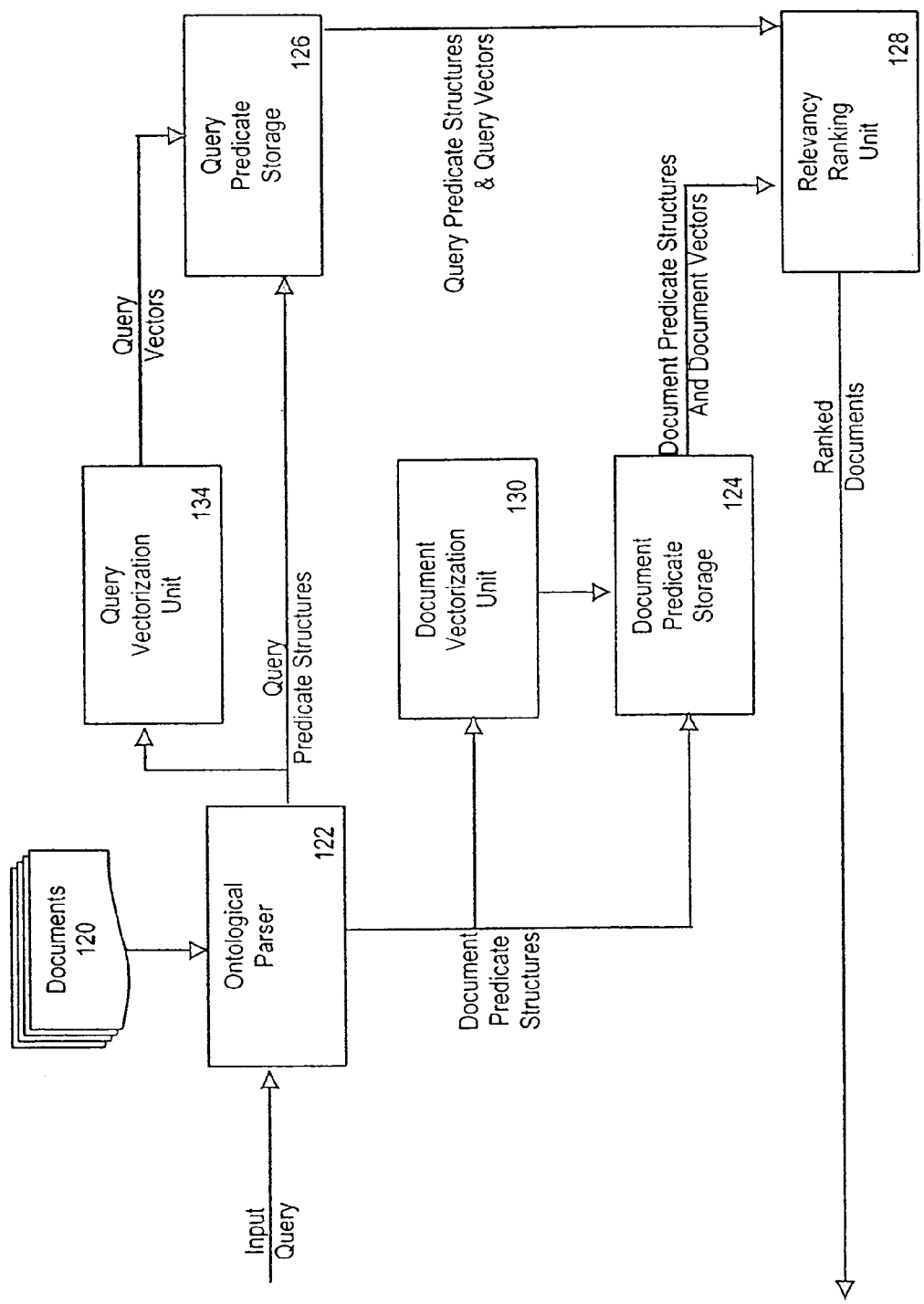
FIG. 14 is a block diagram illustrating the relevancy ranking component according to the present invention.

In FIG. 14, a similar application is illustrated, except that no document clustering is required. Whether because of a constrained search space or because of a precisely worded user query, only one or a few documents in this instance sufficiently match the original user query to be presented to the user. Thus, no document clustering component is involved.

Figure 15:
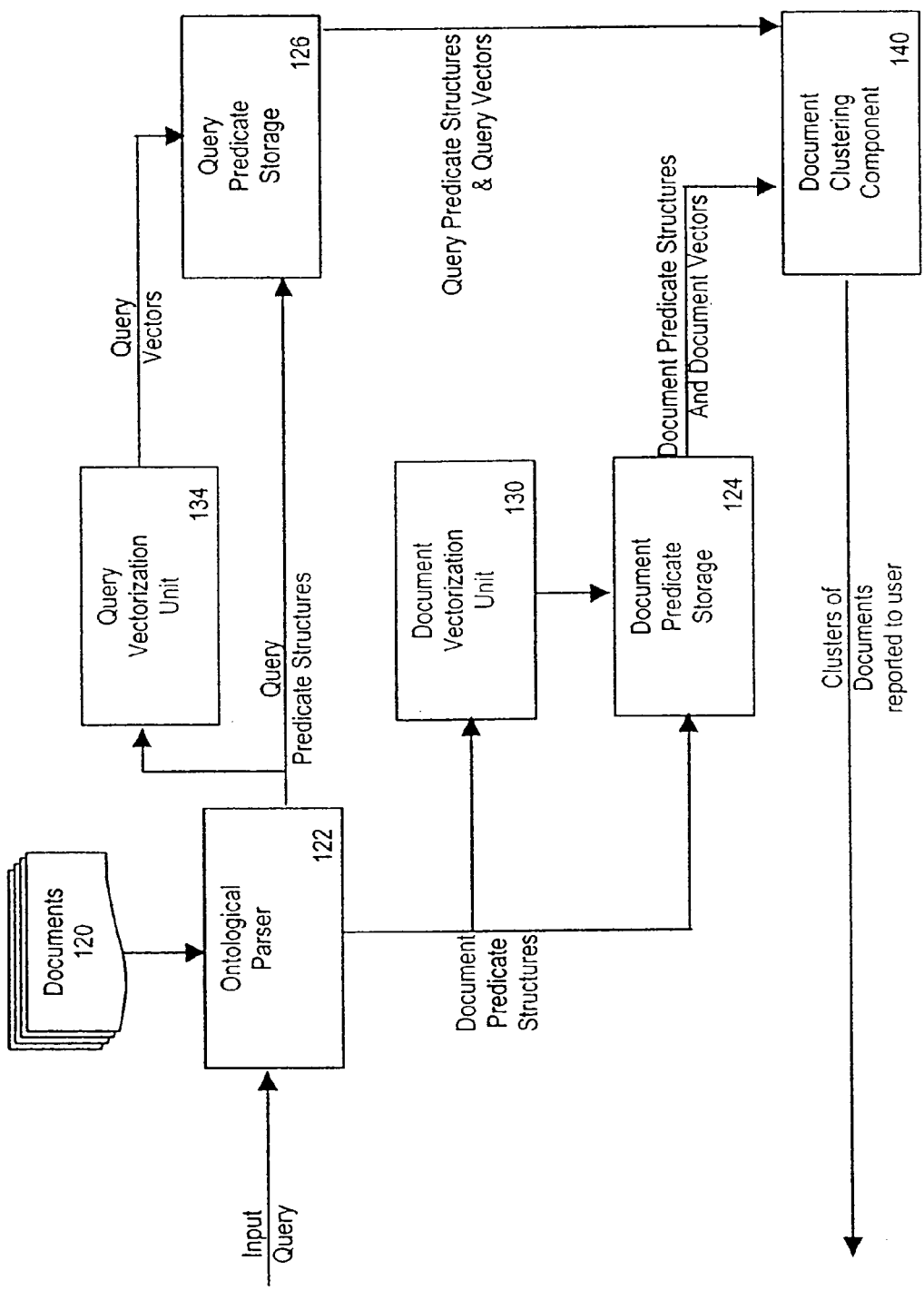
FIG. 15 is a block diagram illustrating the document clustering component according to the present invention.

In FIG. 15, the user may request a scope-of-the-subject type query. In such a situation, the user wants to find out what general types of information are available within the current set of known documents. In this case, there is no need for relevancy ranking. Instead, only the document clustering component 140 is used to determine how the available documents 120 may pertain to the user query. The response to the user lists only the clusters of documents, possibly including one or a few sample documents from each cluster as examples of that cluster's contents. This provides the user with a sense of what kinds of information about a subject are available.

Figure 16:
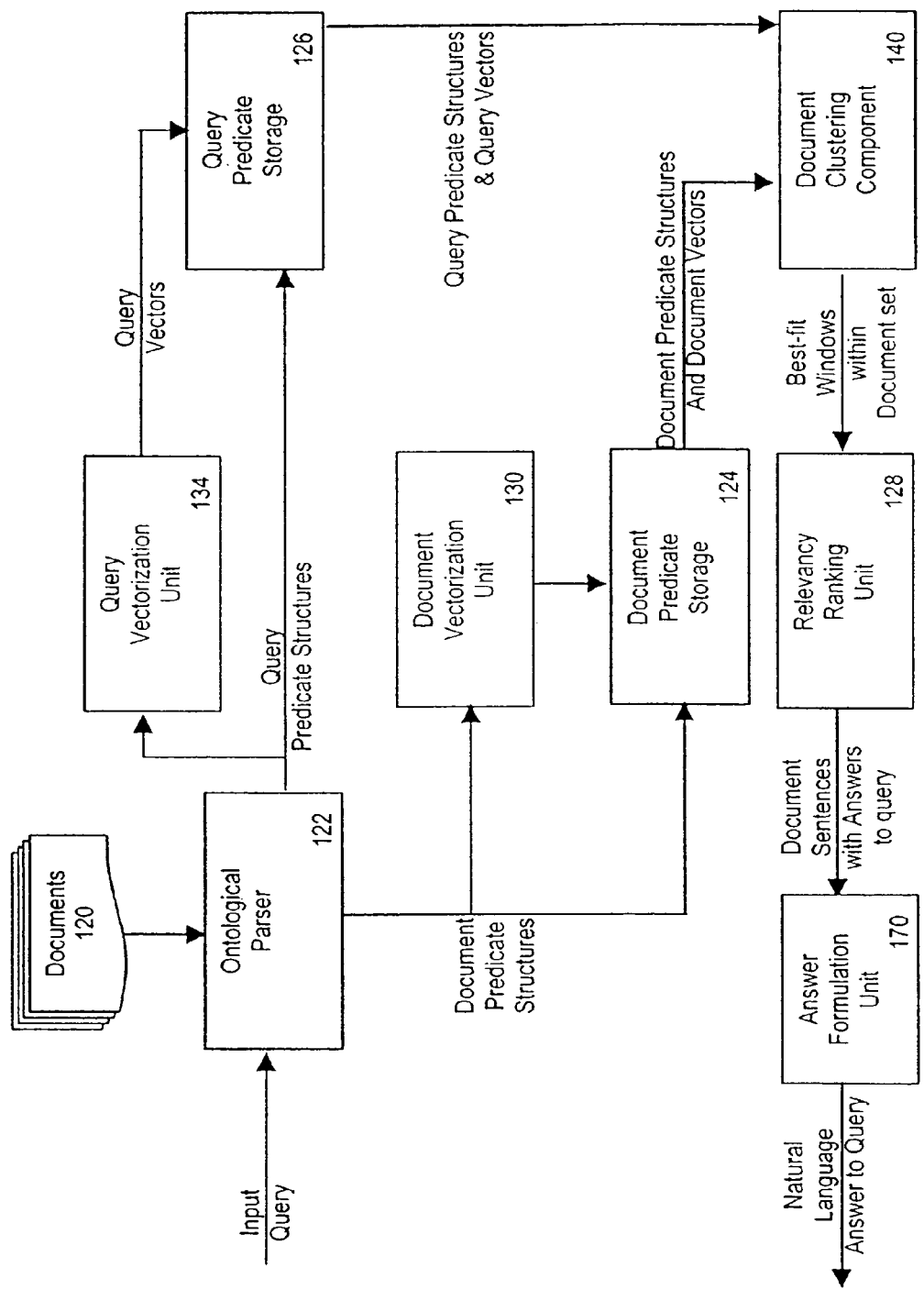
FIG. 16 is a block diagram illustrating the document clustering component followed by the relevancy ranking component according to the present invention.

In FIG. 16, the relevancy ranking and clustering system and method are used as the basis for a question-answering system. In such an application the system first uses the document clustering component 140 to identify documents which have a high degree of relevancy to the user's question. In addition to identifying specific documents likely to contain the answer to the question, the document clustering component 140 identifies one or more windows within each document which are likely to contain the specific answer to the question.

Once those specific windows which contain answers to the user's query are identified, only those windows are passed to the relevancy ranking unit 128 for predicate structure-by-predicate structure comparison to the user query. Some adjustment of the weighting factors shown in FIG. 3 is needed to optimize the relevancy ranking unit to identify the specific predicate structures of the document window that are relevant to the user's question. This process further identifies the specific sentence or phrases within the document which contain the desired answer. A separate Answer Formulation Unit 170 then takes those sentences or phrases and uses them to formulate a natural language answer to the user's original query, which is then returned to the user.

In such a question-answering system, adjusting the dimensionality of the vectors produced by the vectorization unit controls the size of the document window as a system parameter. Using smaller windows improves the efficiency of the relevancy ranking unit 128 by reducing the number of individual predicate structures that must be dealt with. It also, however, forces more work on the document clustering component 140 because each document is represented by more vectors. The specific optimum size for the windows used is determined by experience in a particular user environment.

What is claimed is:

1. One or more computer readable media storing computer executable instructions to perform a method for vectorizing a set of document predicate structures, the method comprising:
    identifying at least one predicate and argument in said set of document predicate structures by a predicate key that is an integer representation;
    estimating conceptual nearness of two of said document predicate structures in said set of document predicate structures by subtracting corresponding ones of said predicate keys; and
    outputting at least one document based upon the estimated conceptual nearness.

2. The computer readable media of claim 1, the method further comprising constructing multi-dimensional vectors using said integer representation.

3. The computer readable media of claim 2, the method further comprising normalizing said multi-dimensional vectors.

4. The computer readable media of claim 3, the method further comprising identifying at least one query predicate structure by a second predicate key that is a second integer representation, and constructing second multi-dimensional vectors, for said at least one query predicate structure, using said second integer representation.

5. The computer readable media of claim 1, the method further comprising identifying at least one query predicate structure by a second predicate key that is a second integer representation, and constructing second multi-dimensional vectors, for said at least one query predicate structure, using said second integer representation.

6. The computer readable media of claim 1, wherein said set of document predicate structures are representations of logical relationships between words in a sentence.

7. The computer readable media of claim 1, wherein each of said document predicate structures in said set includes a predicate and a set of arguments, wherein the predicate is one of a verb and a preposition.

8. One or more computer readable media storing computer executable instructions to perform a method for vectorizing a set of document predicate structures, the method comprising:
    identifying at least one predicate in said set of document predicate structures by a predicate key that is an integer representation;
    estimating conceptual nearness of two of said document predicate structures in said set of document predicate structures by subtracting corresponding ones of said predicate keys; and
    outputting at least one document based upon the estimated conceptual nearness.

9. The computer readable media of claim 8, the method further comprising constructing multi-dimensional vectors using said integer representation.

10. The computer readable media of claim 9, the method further comprising normalizing said multi-dimensional vectors.

11. The computer readable media of claim 10, the method further comprising identifying at least one query predicate structure by a second predicate key that is a second integer representation, and constructing second multi-dimensional vectors, for said at least one query predicate structure, using said second integer representation.

12. The computer readable media of claim 8, the method further comprising identifying at least one query predicate structure by a second predicate key that is a second integer representation, and constructing second multi-dimensional vectors, for said at least one query predicate structure, using said second integer representation.

13. The computer readable media of claim 8, wherein said set of document predicate structures are representations of logical relationships between words in a sentence.

14. One or more computer readable media storing computer executable instructions to perform a method for constructing multi-dimensional vector representations for each document of a set of documents, the method comprising:

- determining each predicate structure of one or more predicate structures M in each document of the set of documents, said M predicate structures including a predicate and at least one argument;
- identifying the predicate and the at least one argument in each of said M predicate structures by a predicate key that is an integer representation;
- determining a fixed number of arguments q for vector construction;
- constructing an N-dimensional vector representation of each document based upon the predicate and q arguments; and
- outputting at least one document of the set of documents based upon the constructed N-dimensional vector representation of the at least one document,
- wherein any predicate structure of said M predicate structures that includes less than q arguments fills unfilled argument positions with a numerical zero.

15. The computer readable media of claim 14, wherein any predicate structure of said M predicate structures that includes more than q arguments omits remaining arguments after q argument positions are filled.

16. The computer readable media of claim 15, wherein conceptual nearness of two of said N-dimensional vector representations is estimated by subtracting corresponding ones of said predicate keys.

17. The computer readable media of claim 15, the method further comprising normalizing said N-dimensional vector representations.

18. The computer readable media of claim 14, wherein conceptual nearness of two of said N-dimensional vector representations is estimated by subtracting corresponding ones of said predicate keys.

19. The computer readable media of claim 14, the method further comprising normalizing said N-dimensional vector representations.

* * * * *